US012790254B2

(12) United States Patent
Lee et al.

(10) Patent No.: US 12,790,254 B2

(45) Date of Patent: Nov. 10, 2026

(54) SYSTEMS AND METHODS FOR GLASS STREAK IMPROVEMENT VIA HIGH RESOLUTION HEATING

(71) Applicant: CORNING INCORPORATED, Corning, NY (US)

(72) Inventors: Wei Yu Lee, Taichung City (TW); Xinghua Li, Horseheads, NY (US); Michael Yoshiya Nishimoto, Horseheads, NY (US); Gaozhu Peng, Horseheads, NY (US); Adam Scott Regula, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 76 days.

(21) Appl. No.: 18/709,929

(22) PCT Filed: Nov. 10, 2022

(86) PCT No.: PCT/US2022/049538

§ 371 (c)(1),
(2) Date: May 14, 2024

(87) PCT Pub. No.: WO2023/096759

PCT Pub. Date: Jun. 1, 2023

(65) Prior Publication Data

US 2025/0011216 A1 Jan. 9, 2025

Related U.S. Application Data

(60) Provisional application No. 63/282,370, filed on Nov. 23, 2021.

(51) Int. Cl.

| | |
|---|---|
| ***C03B 17/06*** | (2006.01) |
| ***C03B 32/00*** | (2006.01) |
| ***C03C 23/00*** | (2006.01) |

(52) U.S. Cl.

CPC .......... *C03B 17/064* (2013.01); *C03B 17/067* (2013.01); *C03B 32/00* (2013.01); *C03C 23/0025* (2013.01)

(58) Field of Classification Search

CPC ............................................ C03B 17/064–067

See application file for complete search history.

(56) References Cited

U.S. PATENT DOCUMENTS 3,607,182 A * 9/1971 Leibowitz ............. C03B 17/064 65/195

6,407,360 B1 * 6/2002 Choo ................ B23K 26/0884 219/121.68

(Continued)

FOREIGN PATENT DOCUMENTS

CN 101855182 A 10/2010

CN 104395693 A 3/2015

(Continued)

OTHER PUBLICATIONS

International Search Report and Written Opinion of the International Searching Authority; PCT/US2022/049538; mailed on Feb. 20, 2023, 10 pages; European Patent Office.

(Continued)

*Primary Examiner* — Jodi C Franklin

(74) *Attorney, Agent, or Firm* — Kevin M. Able; F. Brock Riggs

(57) ABSTRACT

Systems and methods for remediating streak in glass ribbons formed from glass forming processes are disclosed. The systems include a laser that produces a stationary laser beam having a wavelength of from about 1 μm to about 12 μm and a beam width less than or equal to a full width half maximum of a change in the thickness of the glass ribbon over a streak width at a streak location and optical components to condition and direct the laser beam at the streak location. The methods include forming the glass ribbon, identifying a (Continued)

streak in the glass ribbon, and directing the laser beam at the streak location. The laser beam heats the glass ribbon at the location of the streak, which reduces a viscosity of the glass ribbon to cause glass thinning that reduces the severity of the streak.

10 Claims, 15 Drawing Sheets

(56) References Cited

U.S. PATENT DOCUMENTS

| | | | | |
|---|---|---|---|---|
| 8,904,822 | B2 * | 12/2014 | LeBlanc | C03B 17/067 65/29.21 |
| 9,803,974 | B2 * | 10/2017 | Bathelet | G01N 33/386 |
| 10,501,359 | B2 | 12/2019 | Buellesfeld et al. | |
| 2007/0140311 | A1 * | 6/2007 | House | C03B 17/064 65/29.21 |
| 2009/0314032 | A1 * | 12/2009 | Tomamoto | C03B 17/067 65/273 |
| 2010/0051817 | A1 * | 3/2010 | An | C03B 17/064 250/365 |
| 2014/0123703 | A1 * | 5/2014 | LeBlanc | C03B 17/064 65/102 |
| 2015/0076353 | A1 | 3/2015 | Bathelet | |
| 2017/0225994 | A1 * | 8/2017 | Buellesfeld | C03B 23/037 |
| 2019/0195619 | A1 * | 6/2019 | Kress | G01N 25/72 |
| 2019/0375668 | A1 | 12/2019 | Bookbinder et al. | |
| 2024/0208850 | A1 | 6/2024 | Abramov et al. | |

FOREIGN PATENT DOCUMENTS

| | | | | |
|---|---|---|---|---|
| CN | 104768883 | A | 7/2015 | |
| CN | 107032587 | A | 8/2017 | |
| CN | 108025937 | A * | 5/2018 | C03B 17/064 |
| CN | 112088146 | A | 12/2020 | |
| CN | 112334419 | A | 2/2021 | |
| DE | 102006003878 | A1 | 8/2007 | |
| DE | 102018111543 | A1 * | 11/2018 | G05B 1/00 |
| JP | 2007112684 | A * | 5/2007 | C03B 17/064 |
| JP | 2013184876 | A * | 9/2013 | C03B 17/064 |
| TW | I588305 | B | 6/2017 | |
| WO | 2009/060875 | A1 | 5/2009 | |
| WO | WO-2011108564 | A1 * | 9/2011 | C03B 17/06 |
| WO | 2014/074384 | A1 | 5/2014 | |
| WO | WO-2016104805 | A1 * | 6/2016 | C03B 17/068 |
| WO | WO-2019173358 | A1 * | 9/2019 | G02B 27/0988 |
| WO | 2020/210095 | A1 | 10/2020 | |
| WO | WO-2021113132 | A1 * | 6/2021 | C03B 17/067 |
| WO | WO-2021193647 | A1 * | 9/2021 | B32B 17/10568 |

OTHER PUBLICATIONS

Taiwanese Patent Application No. 111144601, Office Action dated Mar. 23, 2026, 3 pages (English Translation 1 only), Taiwanese Patent Office.

Chinese Patent Application No. 202211496314.6, Office Action dated Jul. 9, 2026, 4 pages (English Translation only), Chinese Patent Office.

* cited by examiner

SYSTEMS AND METHODS FOR GLASS STREAK IMPROVEMENT VIA HIGH RESOLUTION HEATING

CROSS-REFERENCE TO RELATED APPLICATIONS

This is a national stage application under 35 U.S.C. § 371 of International Application No. PCT/US2022/049538, filed on Nov. 10, 2022, which claims the benefit of priority under 35 U.S.C. § 119 of U.S. Provisional Application Ser. No. 63/282,370 filed on Nov. 23, 2021, which is incorporated herein by reference in their entireties.

FIELD

The present specification generally relates to glass forming processes for production of continuous glass ribbons and, more specifically, to systems and methods for reducing severity of streak on glass ribbons formed by the glass forming processes.

TECHNICAL BACKGROUND

The fusion process is one technique for forming glass ribbons. The fusion process produces glass ribbons with a relatively low amount of defects and with surfaces having superior flatness. As a result, the fusion process is widely employed for the production of glass substrates that are used in the manufacture of displays for electronic devices and other substrates that require superior flatness. In the fusion process molten glass is fed into a forming body (e.g., a fusion-forming vessel), which includes forming surfaces that converge along a bottom edge of the forming body, e.g., the root. The molten glass flows over the forming surfaces of the forming body and join at the root to form a ribbon of flat glass with pristine surfaces that is drawn from the root of the forming body. The fusion process may be a downdraw process or an updraw process. Glass ribbons may also be produced using a slot draw process or redraw process.

During formation of the glass ribbon, the glass ribbon may develop streaks, which are narrow regions (e.g., <50 millimeters (mm) in width) of the glass ribbon at which the thickness of the glass changes rapidly with changing width. These rapid changes in thickness in the area of the streak can cause distortion of light passing through the glass ribbon, such as causing distortion of images displayed on electronic displays made from the finished glass ribbon or sheet.

SUMMARY

Accordingly, an ongoing need exists for systems and methods for remediating streak in the glass ribbons formed from glass forming processes, such as but not limited to fusion downdraw processes, fusion updraw processes, slot draw processes, redraw processes, or other glass ribbon forming processes in which the glass ribbon is under tension.

In a first aspect of the present disclosure, a method for remediating streak during a glass ribbon forming process includes forming the glass ribbon with a glass forming process: maintaining the glass ribbon under tension; and identifying a streak of the glass ribbon at a location along a width of the glass ribbon at which a rate of change in a thickness of the glass ribbon per unit width of the glass ribbon is greater than or equal to about 1 $nm_t/mm_W$. A streak width of the streak is less than or equal to about 50 mm. The method further includes directing a laser beam at the streak location, where the laser beam has a wavelength of from about 1 μm to about 12 μm and the laser beam heats the glass ribbon at the streak location. Heating the glass ribbon at the location of the streak reduces a viscosity of the glass ribbon to reduce the thickness of the glass ribbon at the streak location, the rate of change in the thickness of the glass ribbon at the location of the streak, or both.

A second aspect of the present disclosure may include the first aspect, wherein the laser beam comprises a linear average power density of from about 10 milliwatts per millimeter (mW/mm) to about 10 watts per millimeter (W/mm).

A third aspect of the present disclosure may include either one of the first or second aspects, wherein a beam width of the laser beam at the point where the laser beam is incident on the glass ribbon is less than or equal to a full width half maximum of the change in the thickness of the glass ribbon over the streak width, where the beam width is defined as the $1/e^2$ width of the laser beam.

A fourth aspect of the present disclosure may include any one of the first through third aspects, wherein the laser beam has a beam width of less than or equal to about 50 mm, where the beam width is defined as the $1/e^2$ width of the laser beam at the point where the laser beam is incident on the glass ribbon.

A fifth aspect of the present disclosure may include any one of the first through fourth aspects, further comprising determining a width, a thickness profile, or both of the streak and adjusting one or more of a power, position, shape, intensity distribution, or combinations of these of the laser beam based on the width, the thickness profile, or both of the streak.

A sixth aspect of the present disclosure may include any one of the first through fifth aspects, further comprising determining a thickness profile of the glass ribbon at the streak location and modifying at least one of a shape or an intensity distribution of the laser beam based on the thickness profile of the glass ribbon at the streak location.

A seventh aspect of the present disclosure may include any one of the first through sixth aspects, wherein the laser beam comprises a top-hat intensity distribution or a Gaussian intensity distribution.

An eighth aspect of the present disclosure may include any one of the first through seventh aspects, further comprising identifying a first streak and a second streak, splitting the laser beam into a first beam and a second beam, directing the first beam at the first streak, and directing the second beam at the second streak.

A ninth aspect of the present disclosure may include any one of the first through eighth aspects, further comprising locating the laser beam with a sight laser beam reflected along a beam path of the laser beam. The sight laser beam has a wavelength in a range of from about 400 nm to about 700 nm, from about 400 nm to about 550 nm, or from about 500 nm to about 550 nm.

A tenth aspect of the present disclosure may include any one of the first through ninth aspects, wherein the streak is a protruding streak and the method comprises directing the laser beam at a center of the streak.

An eleventh aspect of the present disclosure may include any one of the first through tenth aspects, wherein the streak is a recessed streak and the method comprises splitting the laser beam into a first beam and a second beam spaced apart from the first beam and directing the first beam and the second beam to locations proximate the outer edges of the streak.

A twelfth aspect of the present disclosure may include any one of the first through eleventh aspects, wherein directing the laser beam at the streak comprises locating the laser beam at a position along the streak where the glass of the glass ribbon has a viscosity in a range of about $1\times10^4$ poise to about $7.6\times10^{7.6}$ poise.

A thirteenth aspect of the present disclosure may include any one of the first through twelfth aspects, wherein identifying the streak comprises irradiating the glass ribbon with a light source and identifying light bands, dark bands, or both caused by refraction of the light by the changing of the thickness of the glass ribbon at the location of the streak. The light bands, dark bands, or both identify the location of the streak.

A fourteenth aspect of the present disclosure may include any one of the first through thirteenth aspects, wherein the glass forming process is a fusion draw process.

A fifteenth aspect of the present disclosure may include any one of the first through fourteenth aspects, wherein directing the laser beam at the streak location comprises directing the laser beam at the glass ribbon, wherein the laser beam has a first power level sufficient to produce a change in the thickness of the glass ribbon. Directing the laser beam at the streak location further comprises measuring changes in the thickness of the glass ribbon in response to the laser beam, wherein the change in thickness in response to the laser beam identifies the location of the laser beam on the glass ribbon. The method further comprises adjusting a position of the laser beam to the streak position and reducing a power of the laser beam to a second power level that is sufficient to remediate the streak.

A sixteenth aspect of the present disclosure is directed to a system for remediating streak in a glass ribbon, the system comprising a laser that produces a laser beam having a wavelength of from about 1 micrometer to about 12 micrometers and a beam width less than or equal to a full width half maximum of a change in the thickness of the glass ribbon over a streak width at a streak location, where the beam width is defined as the $1/e^2$ width of the laser beam and is determined at a point where the laser beam is incident on the glass ribbon. The system further comprises one or more optical components operable to change one or properties of the laser beam. The laser and the one or more optical components are positioned to direct the laser beam at the streak location.

A seventeenth aspect of the present disclosure may include the sixteenth aspect, further comprising at least one beam splitter operable to split the laser beam into a pass-through portion and a measurement portion of the laser beam.

An eighteenth aspect of the present disclosure may include the seventeenth aspect, further comprising a power detector, where the at least one beam splitter is operable to direct the passthrough portion of the laser beam at the streak location and to direct the measurement portion of the laser beam to the power detector.

A nineteenth aspect of the present disclosure may include any one of the seventeenth or eighteenth aspects, further comprising a sight laser operable to produce a sight laser beam having a wavelength in a range that is in a range of about 400 nm to about 700 nm and that does not pass through the glass ribbon. The beam splitter is operable to direct the sight laser beam from the sight laser along a beam pathway of the laser beam, the sight laser beam indicating a position of the laser beam on the glass ribbon.

A twentieth aspect of the present disclosure may include the nineteenth aspect, wherein the sight laser produces the sight laser beam having a wavelength in a range of from about 500 nm to about 550 nm.

A twenty-first aspect of the present disclosure may include any one of the sixteenth through twentieth aspects, wherein the one or more optical components comprises a collimating lens operable to collimate the laser beam.

A twenty-second aspect of the present disclosure may include any one of the sixteenth through twenty-first aspects, wherein the one or more optical components comprise diffractive optical components operable to change a shape, an intensity distribution, or both of the laser beam.

A twenty-third aspect of the present disclosure may include any one of the sixteenth through twenty-second aspects, further comprising a fiber optic cable extending from the laser to a position proximate the glass ribbon and a fiber optic connector coupled to the end of the fiber optic cable. The fiber optic cable is operable to deliver the laser beam from the laser to a location proximate the glass ribbon.

A twenty-fourth aspect of the present disclosure may include the twenty-third aspect, wherein the fiber optic cable comprises a hollow core fiber or a polycrystalline fiber.

A twenty-fifth aspect of the present disclosure may include any one of the sixteenth through twenty-fourth aspects, further comprising an articulated arm laser beam delivery system coupled to the laser, the articulated arm laser beam delivery system comprising a plurality of movable joints and a plurality of mirrors operable to direct the laser beam from the laser to the glass ribbon through an enclosed beam pathway with a controllable atmosphere.

A twenty-sixth aspect of the present disclosure may include any one of the sixteenth through twenty-fifth aspects, further comprising a laser positioning stage coupled to the laser or to a fiber optic connector coupled to an end of a fiber optic cable attached to the laser, the laser positioning stage operable to adjust a position of the laser beam relative to the glass ribbon.

A twenty-seventh aspect of the present disclosure may include the twenty-sixth aspect, wherein the laser positioning stage comprises a plate pivotally coupled to a fixed point proximate the location of the streak. The one or more optical components are coupled to the plate, and the plate is rotatable about a pivot point. Rotating the plate about the pivot point positions the heating laser beam relative to the glass ribbon.

A twenty-eighth aspect of the present disclosure may include any one of the sixteenth through twenty-seventh aspects, further comprising a control system, the control system comprising a processor communicatively coupled to the laser and to a power detector, a memory module communicatively coupled to the processor, and machine readable and executable instructions stored on the memory module. The one or more optical components comprise a beam splitter operable to split the laser beam into a pass-through portion and a measurement portion. The power detector is positioned to receive the measurement portion of the laser beam. The machine readable and executable instructions, when executed by the processor, cause the system to automatically determine a measured power of the laser beam using the power detector and adjust a power output of the laser based on the measured power of the laser beam.

A twenty-ninth aspect of the present disclosure may include any one of the sixteenth through twenty-eighth aspects, wherein the laser beam is vertically positioned at a location where the glass has a viscosity in the working range of from about $10^4$ poise to about $7.6\times10^{7.6}$ poise.

A thirtieth aspect of the present disclosure may include any one of the sixteenth through twenty-ninth aspects, wherein the one or more optical components comprises a second beam splitter operable to split the laser beam into at least a first beam and a second beam and second focusing optical components operable to direct the second beam to a second location on the glass ribbon.

A thirty-first aspect of the present disclosure may include the thirtieth aspect, wherein the second beam splitter comprises a prism, diffractive optical element, an axicon, or combinations of these.

A thirty-second aspect of the present disclosure may include any one of the thirtieth or thirty-first aspects, wherein the second location on the glass ribbon comprises a streak location of a second streak or a location proximate an outer edge of a recess streak.

A thirty-third aspect of the present disclosure is directed to a system for producing a glass ribbon, the system comprising a fusion downdraw process comprising a forming body comprising two forming surfaces that converge at a root. The system further includes the system for remediating streak in the glass ribbon according to any of the sixteenth through thirty-second aspects. In embodiments, the system includes a laser operable to produce a laser beam having a wavelength of from about 1 micrometer to about 12 micrometers and a beam width less than a full width half max of a change in the thickness of the glass ribbon at a location of the streak, where the beam width is defined as the $1/e^2$ width of the laser beam and is determined at a point where the laser beam is incident on the glass ribbon. The system further comprises one or more optical components operable to change one or properties of the laser beam. The laser and the one or more optical components are positioned to direct the laser beam at the streak location.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

Figure 1:
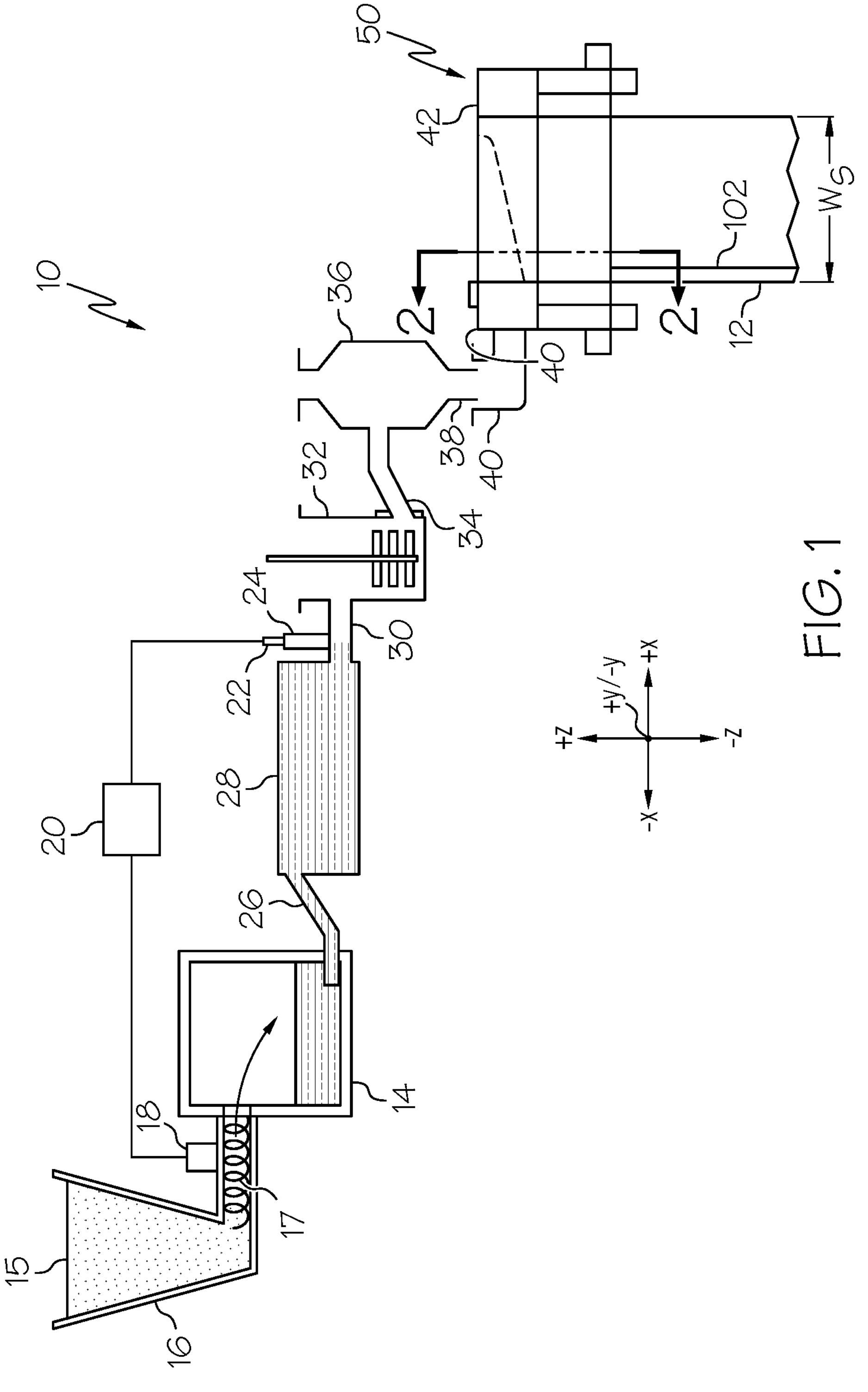
FIG. 1 schematically depicts a glass forming apparatus, according to one or more embodiments shown and described herein.

The drawings are not to scale, and certain features may be exaggerated for purposes of illustration.

DETAILED DESCRIPTION

Reference will now be made in detail to embodiments of systems and methods for remediating streak in glass ribbons produced from glass forming processes, examples of which are illustrated in the accompanying drawings. Whenever possible, the same reference numerals will be used throughout the drawings to refer to the same or like parts.

Figure 4:
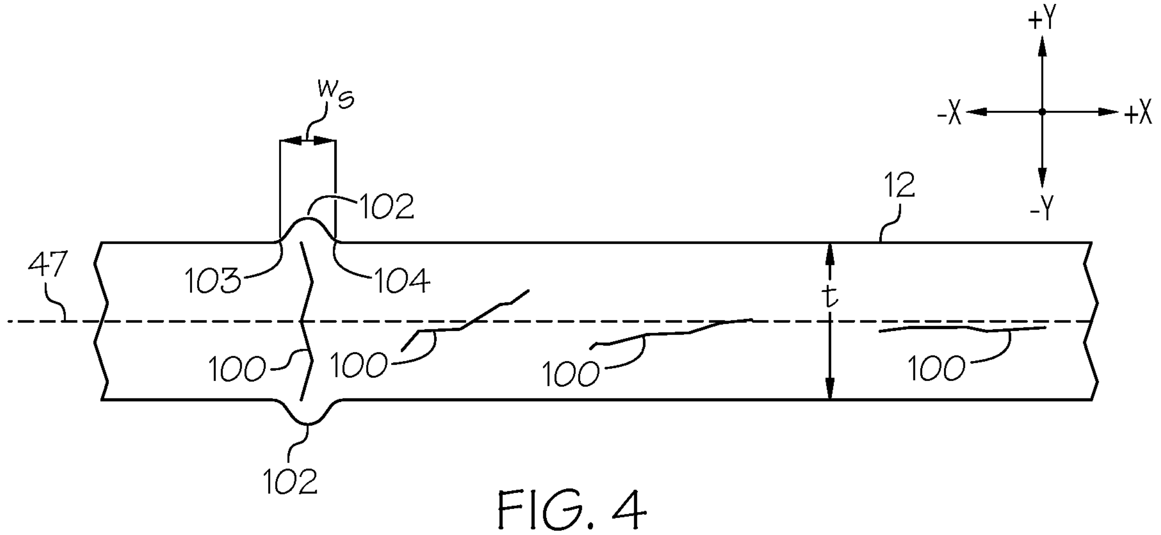
FIG. 4 schematically depicts a cross-sectional view of a glass ribbon produced by the glass forming apparatus of FIGS. 1-3 and having a streak, according to one or more embodiments shown and described herein.

Referring now to FIG. 4, one embodiment of a portion of a glass ribbon 12 having a streak 102 is schematically depicted. The streak 102 may be a narrow region (e.g., <50 mm in width) of the glass ribbon 12 that exhibits a rapid change in the thickness t of the glass ribbon 12 as a function of the width of the glass ribbon 12. As will be described in further detail herein, the changing thickness of the glass ribbon 12 at the location of the streak 102 can act as a lens that changes the direction of light passing through the glass, resulting in distortion of images displayed by electronic displays made from the glass ribbon 12.

Figure 6:
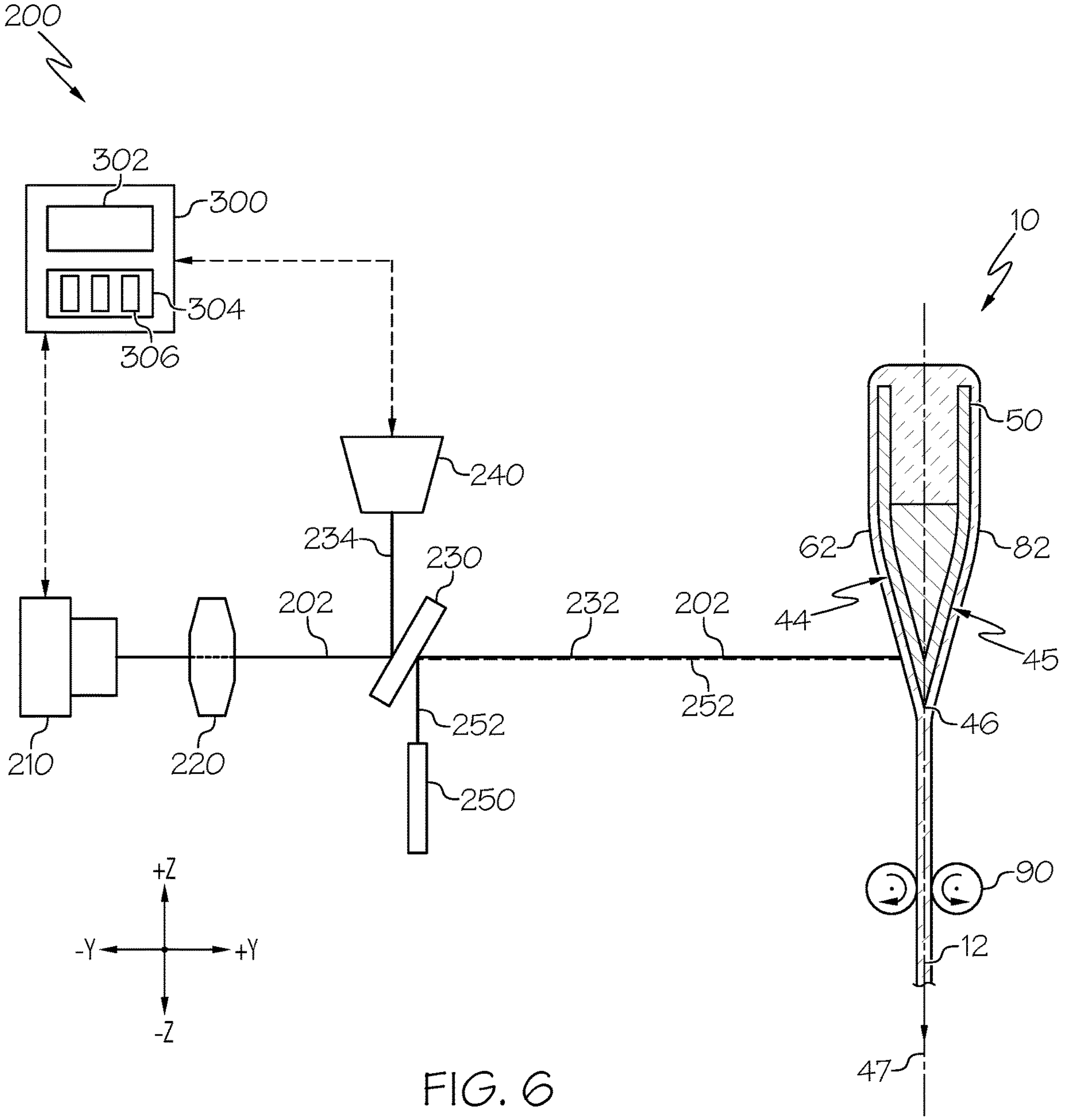
FIG. 6 schematically depicts a system for remediating streak, according to one or more embodiments shown and described herein.

Referring to FIG. 6, one embodiment of a system 200 of the present disclosure for remediating streak 102 in glass ribbons 12 is schematically depicted. The system 200 includes a heating laser 210 that produces a laser beam 202. The system 200 may include one or more optical components 220 that may be operable to collimate, expand, or focus the laser beam 202. The heating laser 210 and optical components 220 are positioned to direct the laser beam 202 at the streak 102.

The system 200 may be used in a method of remediating streak 102 in a glass ribbon 12. The method may include forming the glass ribbon 12, maintaining the glass ribbon 12 under tension, identifying one or more streaks 102 of the glass ribbon 12 at a location along a width of the glass ribbon 12, and directing the laser beam 202 at the streak 102 location using the system 200. The laser beam 202 provides localized heating to the glass ribbon 12 or a portion of the glass ribbon 12 at the location of the streak 102, which may cause the glass to thin under tension. The thinning of the glass may reduce the severity of the streak, such as by reducing the thickness of the glass ribbon 12, the rate of change in the thickness of the glass ribbon 12, or both in the region of the streak 102. Reducing the severity of the streak may reduce or eliminate distortion of images displayed on electronic displays made from the glass ribbon 12.

Various embodiments of the systems and methods for remediating streak in glass ribbons will be further described herein with specific reference to the appended drawings.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and: the number or type of embodiments described in the specification.

As used herein, the singular forms "a," "an" and "the" include plural referents unless the context clearly dictates otherwise. Thus, for example, reference to "a" component includes embodiments having two or more such components, unless the context clearly indicates otherwise.

As used herein, the term "thickness" in reference to the glass ribbon refers to the distance between two opposing points on opposite surfaces of the glass ribbon, where the opposite surfaces of the glass ribbon are the surfaces with the largest width. In the accompanying drawings, the thickness refers to the distance in the +/−Y direction of the coordinate axis between two opposing points on opposite surfaces of the glass ribbon.

As used herein, the term "high resolution" refers to a resolution in the width direction of the glass ribbon of less than or equal to 50 mm, such as from 1 mm to 50 mm.

As used herein, the terms "up beam" and "down beam" refers to the positioning of two or more components relative to the direction of travel of a laser beam along a beam pathway. A first component may be considered to be up beam of a second component if the laser beam encounters the first component before encountering the second component. Likewise, a first component may be considered to be down beam of a second component when the laser beam encounters the second component before encountering the first component.

Aspects of the systems and methods of the present disclosure are described herein in the context of a fusion downdraw process using the glass forming apparatus of FIG. 1. However, the systems and methods disclosed herein may be equally applied to slot draw, updraw, or redraw processes with similar results.

Referring now to FIG. 1, a glass forming apparatus 10 for making glass articles, such as glass ribbons 12, is schematically depicted. The glass forming apparatus 10 may generally include a melting vessel 14 that receives batch material 15 from a storage bin 16. The batch material 15 can be introduced to the melting vessel 14 by a batch delivery device 17 powered by a motor 18. An optional process controller 20 may be provided to activate the motor 18 and a molten glass level probe 22 can be used to measure the glass melt level within a standpipe 24 and communicate the measured information to the controller 20.

The glass forming apparatus 10 can also include a fining vessel 28, such as a fining tube, coupled to the melting vessel 14 by way of a first connecting tube 26. A mixing vessel 32 may be coupled to the fining vessel 28 with a second connecting tube 30. A delivery vessel 36 may be coupled to the mixing vessel 32 with a delivery conduit 34. As further illustrated, a downcomer 38 may be positioned to deliver glass melt from the delivery vessel 36 to an inlet end 40 of a forming body 50. In the embodiments shown and described herein, the forming body 50 is a fusion-forming vessel as described herein above.

The melting vessel 14 is typically made from a refractory material, such as refractory (e.g., ceramic) brick. The glass forming apparatus 10 may further include components that are typically made from electrically conductive refractory metals such as, for example, platinum or platinum-containing metals such as platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. The platinum-containing components can include one or more of the first connecting tube 26, the fining vessel 28, the second connecting tube 30, the standpipe 24, the mixing vessel 32, the delivery conduit 34, the delivery vessel 36, the downcomer 38, and the inlet end 40.

Figure 2:
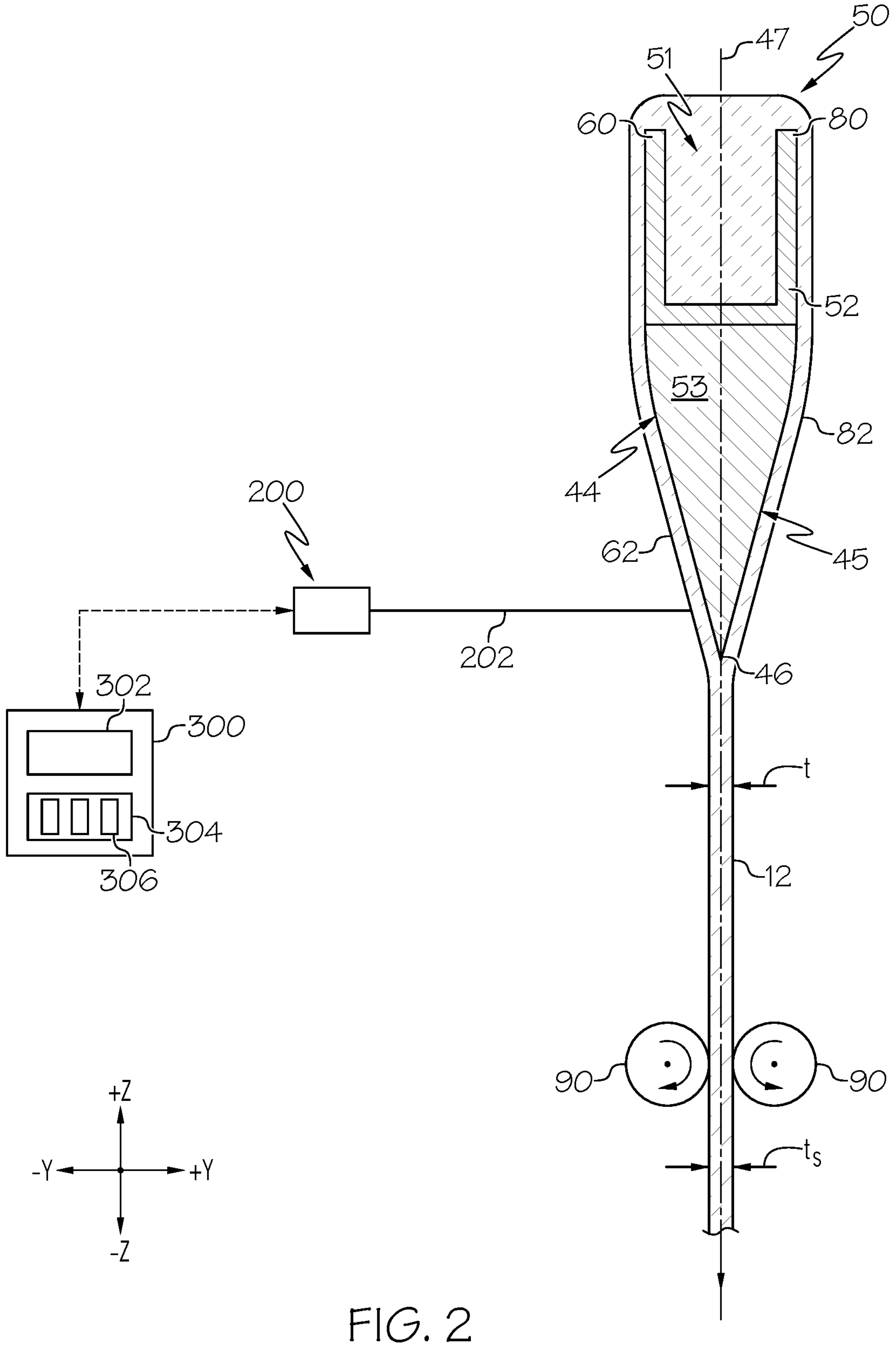
FIG. 2 schematically depicts a cross-sectional view of a portion of the glass forming apparatus of FIG. 1 taken along reference line 2-2 in FIG. 1, according to one or more embodiments shown and described herein.

Referring now to FIG. 2, the forming body 50 generally includes a trough 51, a first forming surface 44, and a second forming surface 45. The trough 51 is located in an upper portion 52 of the forming body 50 and includes a first weir 60, a second weir 80, and a base 53 extending between the first weir 60 and the second weir 80. The trough 51 may vary in depth as a function of length along the forming body 50. The first forming surface 44 and the second forming surface 45 extend from the upper portion 52 of the forming body 50 in a vertically downward direction (i.e., the −Z direction of the coordinate axes depicted in the figures) and converge toward one another, joining at a lower (bottom) edge of the forming body 50, i.e., the root 46. Accordingly, it should be understood that the first forming surface 44 and the second forming surface 45 may, in embodiments, form an inverted isosceles (or equilateral) triangle extending from the upper portion 52 of the forming body 50 with the root 46 forming the lower-most vertex of the triangle in the downstream direction. A draw plane 47 generally bisects the root 46 in the +/−Y directions of the coordinate axes depicted in the figures and extends in the vertically downward direction (i.e., the −Z direction) and in the +/−X directions.

The forming body 50 is typically formed from refractory ceramic materials that are chemically compatible with the molten glass and capable of withstanding the high temperatures associated with the fusion forming process, although in further embodiments, portions of the forming body, or the entire forming body may be formed of other materials, for example metallic materials. Typical ceramic refractory materials from which the forming body can be formed include, without limitation, zircon (e.g., zirconium silicate), low creep zircon, silicon carbide, xenotime, and/or alumina based refractory ceramics.

Referring again to FIG. 1, in operation, batch material 15, specifically batch material for forming glass, is fed from the storage bin 16 into the melting vessel 14 with the batch delivery device 17. The batch material 15 is melted into molten glass in the melting vessel 14. The molten glass passes from the melting vessel 14 into the fining vessel 28 through the first connecting tube 26. Dissolved gasses, which may result in glass defects, are removed from the molten glass in the fining vessel 28. The molten glass then passes from the fining vessel 28 into the mixing vessel 32 through the second connecting tube 30. The mixing vessel 32 homogenizes the molten glass, such as by stirring, and the homogenized molten glass passes through the delivery conduit 34 to the delivery vessel 36. The delivery vessel 36 discharges the homogenized molten glass through downcomer 38 and into the inlet end 40 of the forming body 50, which in turn passes the homogenized molten glass into the trough 51 of the forming body 50.

Referring again to FIG. 2, the homogenized molten glass fills the trough 51 of the forming body 50 and ultimately overflows the trough 51, flowing over the first weir 60 and second weir 80 along the length of the trough 51 and then in the vertically downward direction (−Z direction of the coordinate axis in FIG. 2). The homogenized molten glass flows from the upper portion 52 of the forming body 50 and onto the first forming surface 44 and the second forming surface 45. In particular, a first half ribbon 62 flows over the first weir 60 and onto the first forming surface 44, and a second half ribbon 82 flows over the second weir 80 and onto the second forming surface 45. The first half ribbon 62 and second half ribbon 82 flowing over the first forming surface 44 and the second forming surface 45, respectively, join and fuse together at the root 46, forming the glass ribbon 12 that is drawn along the draw plane 47 in the downstream direction by pulling rollers 90 disposed vertically below (i.e., in the −Z direction) the root 46. The glass ribbon 12 may be further processed downstream of the forming body 50 such as by segmenting the glass ribbon 12 into discrete glass sheets, rolling the glass ribbon 12 upon itself, and/or applying one or more coatings to the glass ribbon 12.

The pulling rollers 90 may be driven rollers that are operatively coupled to a drive mechanism. The pulling rollers 90 may be positioned vertically below (i.e., in the −Z direction) the root 46 by a distance sufficient for the glass ribbon 12 to cool to a temperature at which the viscosity of the glass is great enough that the pulling rollers 90 do not cause deformation of the surfaces of the glass ribbon 12. The pulling rollers 90 may be operable to maintain the glass ribbon 12 under tension.

Glass ribbons 12 produced from fusion draw processes, slot draw processes, re-draw processes or other glass forming processes can exhibit one or more streaks. As previously discussed, a streak is a physical defect on the glass ribbon 12 that can cause distortion of images displayed on electronic displays made from the glass ribbon 12. A streak is a singular defect that is localized in a certain location along the width of the glass ribbon 12. A streak is characterized by a rapid change in the overall thickness of the glass ribbon 12 as a function of width over a narrow region of the width of the glass ribbon 12, such as a width region of less than 50 millimeters (mm) or less than 40 mm. The rapid changes in thickness of the glass ribbon 12 at the location of the streak can act as narrow lenses that refract, e.g., focus, light passing through the glass ribbon 12. This manipulation of the light by the streak can cause distortion of images displayed on electronic displays comprising portions of the glass ribbon 12 having the streak.

A streak can result from several different causes, such as but not limited to defects on the surface of the forming body 50, alignment of cord within the glass ribbon 12, or other causes. For example, in some instances, a streak can result from alignment of cord within the glass ribbon 12 in a direction perpendicular to the draw plane 47 of the glass ribbon 12. As used herein, “cord” refers to a thin layer of glass within the glass ribbon 12, where the thin layer of glass has a different composition from the overall glass composition of the glass ribbon. Referring now to FIG. 4, the thin layers of glass representing cord 100 can be present within the glass ribbon 12 and can be disposed at various angles within the glass ribbon 12. As the cord 100 becomes more perpendicular to the outer surfaces of the glass ribbon 12, the cord 100 can produce a protrusion or a depression in one or both outer surfaces of the glass ribbon, where the protrusion or depression is narrow in the width direction (i.e., +/−X direction of the coordinate axis in FIG. 4), such as less than 50 mm. At the protrusion or depression, the glass has a thickness that changes rapidly with width (e.g., greater than 1 nanometer of change in thickness per millimeter (mm) of width). This rapid change in thickness over a narrow width of the glass ribbon 12 is referred to as a streak 102. Although the streak 102 is shown in FIG. 4 protruding outward from both surfaces of the glass ribbon 12, a streak 102 may occur when only one side of the glass ribbon 12 comprises a protrusion or depression resulting in the rapid change in thickness with the width. When the viscosity of the glass of the cord 100 is greater than the viscosity of the overall glass composition of the glass ribbon 12, the cord 100 can produce a streak 102 that comprises a protrusion that protrudes outward from one or both of the outer surfaces of the glass ribbon 12. When the viscosity of the glass of the cord 100 is less than the viscosity of the overall glass composition of the glass ribbon 12, the cord 100 can result in a streak 102 that is a depression sunken inward relative to one or both outer surfaces of the glass ribbon 12.

Referring again to FIGS. 1-3, in other instances, streak 102 can also be caused by defects on the forming body 50, such as defects on the first forming surface 44, the second forming surface 45, first weir 60, second weir 80, or combinations of these. During glass manufacturing in a fusion downdraw process, such as a processing using the glass forming apparatus 10 in FIGS. 1-3 for example, potential surface defects on the forming body 50 can result in very narrow but sharp thickness variation in the first half ribbon 62 or second half ribbon 82. The sharp thickness variations in the first half ribbon 62, second half ribbon 82, or both are translated to the glass ribbon 12 when the first half ribbon 62 and second half ribbon 82 are fused at the root 46. Temperature and flow non-uniformities of the first half ribbon 62, second half ribbon 82, glass ribbon 12, or combinations thereof can further enhance these variations. These thickness features (i.e., streaks 102) are typically oriented along the direction of the draw (i.e., in the +/−Z direction of the coordinate axis in FIG. 3).

In most instances, the slope of the thickness change as a function of width at the streak 102 are small and the thickness variations are within specifications for the glass ribbon 12 under stringent inspection conditions. However, if the slope of the change in thickness as a function of width at the streak 102 exceeds a threshold limit, the glass at the streak 102 can act like a cylinder lens and form dark and bright bands during inspection with a light source. In analogy with optical lenses, bright bands are formed by an increase in glass thickness (protrusions) locally at the streak 102. The local thickening of the glass is typically on the order of hundreds of nanometers (nm) in thickness change over a distance of 10 mm to 20 mm in width across the glass ribbon 12.

Figure 5:
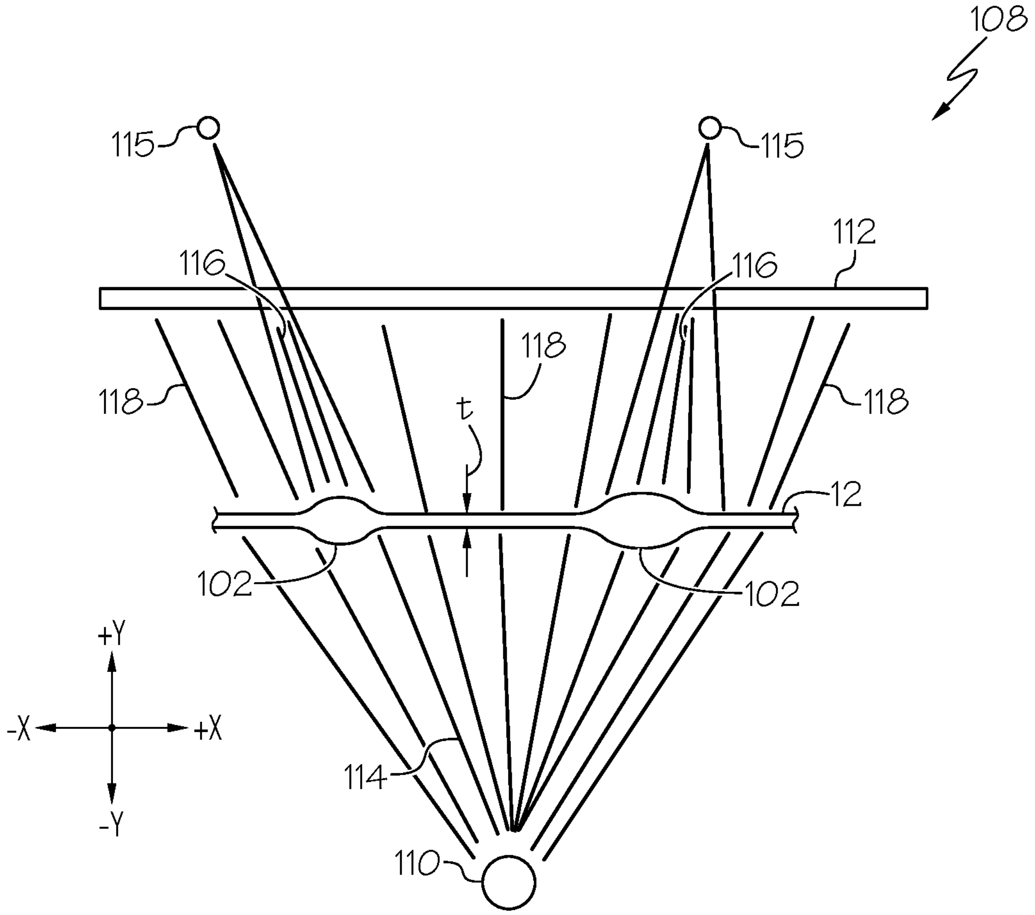
FIG. 5 schematically depicts a streak detection system, according to one or more embodiments shown and described herein.

Streaks 102 can be identified by irradiating the glass ribbon 12 with light from a light source and identifying light and dark areas on a screen caused by the lens effect of the surface protrusion or surface depression of the streak 102. Referring to FIG. 5, streak in the glass ribbon 12 can be identified by a streak inspection system 108. The streak inspection system 108 may include an inspection light source 110 and an inspection screen 112. The inspection light source 110 may be positioned to direct light 114 at a first surface of the glass ribbon 12. The inspection light source 110 may be a xenon light source. The inspection screen 112 may be positioned on the side of the glass ribbon 12 opposite from the inspection light source 110 so that the light 114 passing through the glass ribbon 12 falls incident on the inspection screen 112. At the streak 102 location on the glass ribbon 12, the rapidly changing thickness of the glass acts as a narrow lens that produces light bands and dark bands on the inspection screen 112.

Referring now to FIG. 5, identifying one or more streaks 102 in the glass ribbon 12 may include irradiating the glass ribbon 12 with light 114 from the inspection light source 110. The light 114 passes through the glass ribbon 12 and is incident on the inspection screen 112. The changing thickness of the glass in the region of the streak 102 acts as a lens that refracts the light passing through the region of the streak 102 to form light bands 116 and dark bands 118 on the inspection screen 112. Identifying the streaks 102 further includes identifying light bands 116, dark bands 118, or both on the inspection screen 112 caused by refraction of the light 114 by the changing of the thickness of the glass ribbon 12 at the location of the streak 102. The light bands 116, dark bands 118, or both identify the location of the streak 102. Dark areas correspond to thinner regions of the glass, and light areas correspond to thicker regions of the glass.

Light bands are caused by streaks 102 that protrude from the glass ribbon 12 such that the thickness increases at the location of the streak 102 relative to the rest of the glass ribbon 12. As shown in FIG. 5, when the streak 102 comprises a protrusion where the glass thickens, the increasing thickness of the glass acts as a convex focusing lens that focuses light toward one or more focal points 115, thus resulting in light bands 116. The regions of the glass ribbon 12 outside of the region of the streak 102 produce a darker exposure of the light on the inspection screen 112 compared to the steak 102 comprising a protrusion of increasing glass thickness.

Dark bands are caused by streaks 102 that are recessed into the glass ribbon 12 such that the thickness decreases at the location of the streak 102 relative to the portions of the glass ribbon 12 outside of the region of the streak 102. When the streak 102 comprises a recess where the glass gets thinner, the decreasing thickness of the glass acts as a concave diverging lens that causes the light to spread away from a focal point at or upstream of the lens, thus resulting in dark bands 116 on the inspection screen 112. The regions of the glass ribbon 12 outside of the region of the streak 102 may produce a lighter exposure of the light on the inspection screen 112 compared to a streak 102 comprising a recess where the thickness of the glass is less.

Each streak 102 may be a discrete location along the width of the glass ribbon 12 and may extend longitudinally (i.e., in the −Z direction of coordinate axis in FIG. 3) along the glass ribbon 12. At the location of the streak 102, the thickness t of the glass ribbon 12 may change (e.g., increase or decrease) by hundreds of nanometers over a width of the glass ribbon 12 of less than about 50 mm, for example less than about 40 mm. At the location of the streak 102, the rate of change in the thickness t of the glass ribbon 12 as a function of width W of the glass ribbon 12 may be sufficient to focus or converge light passing through the glass to cause light bands and dark bands on the inspection screen 112. At the location of the streak 102, the rate of change in the thickness t of the glass ribbon 12 as a function of width W of the glass ribbon 12 may be greater than or equal to about 1 nanometer in thickness per millimeter of width ($nm_t/mm_W$). For example, at the location of the streak 102, the rate of change in the thickness t of the glass ribbon 12 as a function of width W of the glass ribbon 12 may be greater than or equal to about 3 $nm_t/mm_W$, greater than or equal to about 4 $nm_t/mm_W$, greater than or equal to about 5 $nm_t/mm_W$, greater than or equal to about 10 $nm_t/mm_W$, greater than or equal to about 20 $nm_t/mm_W$, or even greater than or equal to about 30 $nm_t/mm_W$. The severity of the streak 102 refers to the magnitude in the rate of change of the thickness t of the glass ribbon 12 as a function of the width of the glass ribbon 12. Generally, increasing severity of the streak 102 corresponds to a greater difference between the maximum thickness (protruding streak) or minimum thickness (recessed streak) of the glass ribbon 12 in the region of the streak 102 and the average thickness t of the glass ribbon 12 averaged across the entire width W of the glass ribbon 12.

Referring again to FIG. 4, the streak 102 has a streak width Ws, which is defined herein as the full width half maximum of a Gaussian distribution of the change in the thickness t of the glass at the location of the streak 102. The full width half maximum of the Gaussian distribution of the change in the thickness t of the glass ribbon 12 refers to the distance between two width locations along the streak width Ws at which locations the change in the thickness t of the glass ribbon 12 is equal to one half of the maximum value of the change in the thickness t of the glass ribbon 12 in the region of the streak 102. The change in the thickness t of the glass ribbon 12 refers to the difference between the actual thickness t of the glass ribbon 12 and the average thickness of the glass ribbon 12, which is averaged over the entire width of the glass ribbon 12.

Each of the streaks 102 may have a streak width Ws that is less than or equal to about 50 mm, less than or equal to about 40 mm, less than or equal to about 30 mm, less than or equal to about 20 mm, or even less than or equal to about 10 mm. Each of the streaks 102 may have a streak width that is greater than zero, such as greater than or equal to about 0.5 mm, greater than or equal to about 1 mm, greater than or equal to about 5 mm, or even greater than or equal to about 10 mm. In embodiments, each streak 102 may have a width of from greater than zero to about 50 mm, such as from about 0.5 mm to about 50 mm, from about 0.5 mm to about 40 mm, from about 0.5 mm to about 30 mm, from about 0.5 mm to about 20 mm, from about 0.5 mm to about 10 mm, from about 1 mm to about 50 mm, from about 1 mm to about 40 mm, from about 1 mm to about 30 mm, from about 1 mm to about 20 mm, from about 1 mm to about 10 mm, from about 5 mm to about 50 mm, from about 5 mm to about 40 mm, from about 5 mm to about 30 mm, from about 5 mm to about 20 mm, from about 10 mm to about 50 mm, from about 10 mm to about 40 mm, from about 10 mm to about 30 mm, or from about 10 mm to about 20 mm. The width of the streak 102 is measured parallel to the width W of the glass ribbon 12, which is generally in the +/−X direction of the coordinate axis in FIGS. 1-5. The streak 102 may extend continuously in the length direction (i.e., +/−Z direction of the coordinate axis in FIGS. 1-3) for the entire length of the glass ribbon 12.

As previously discussed, streak in the glass ribbon 12 can cause products produced from the glass ribbon 12, such as but not limited to screens for electronic devices, to exhibit distortion in displayed images. The changing thickness of the glass at the location of the streak 102 may cause refraction of light at these locations, resulting in distortion of images displayed on screens comprising the glass. Thus, streak in the glass ribbon 12 can result in quality issues and/or increased waste. Therefore, an ongoing need exists for systems and methods for remediating streak in glass ribbons produced from fusion draw processes, such as by reducing the severity of the streak.

The local thickening (protrusion) of the glass ribbon comprising streak can be mitigated with local heating of the glass ribbon 12, the first half ribbon 62, or the second half ribbon 82 while the viscosity of the glass is within the working range ($10^4$~$7.6\times10^{7.6}$ Poise) in a draw process in which the glass ribbon 12 is under tension. Localized heating of the glass ribbon 12, first half ribbon 62, and/or second half ribbon 82 reduces local glass viscosity and thinning is achieved when glass is under tension (e.g., with pulling rollers, force of gravity, etc.). Traditional resistive heaters used for localized heating of glass ribbons typically heat up a wide area of the glass (e.g., greater than 100 mm in width) and are not effective at producing controlled, localized heating at the region of the streak 102. This inability to provide targeted localized heating can produce further anomalies in the glass ribbon rather than remediating streak.

The present application is directed to systems and methods of remediating streak in a draw process, for example a fusion down draw process, updraw process, slot draw process, or redraw process, by creating high resolution heating with well-controlled power on the glass near the root 46 of the forming body 50 to smooth out changes in thickness of the glass ribbon 12 associated with the streak 102. High resolution heating of the glass at the streak location lowers the viscosity and reduces the local thickness of the glass (with the immediately adjacent area thickness relatively higher for mass conservation). The technique works by reducing thickness, and/or by reducing slope of the change in thickness of the glass ribbon 12 as a function of width through localized high-resolution heating. The systems and methods of the present disclosure include a heating laser and optical components configured to modify the laser beam and direct the laser beam at the location of the streak. The laser beam provides high resolution heating (e.g., heating of <50 mm of width) with well-controlled power. Due to the directional and spatially well-defined nature of lasers, heating lasers are very effective in localized heating of glass.

The systems and methods of the present application can reduce the severity of or eliminate streak in glass ribbons, which may reduce or eliminate distortion of light through articles made from the glass ribbon, such as distortion of images displayed on electronic displays made from the glass ribbon. Reducing the distortion of light passing through the glass ribbon may in turn reduce quality problems and reduce waste produced from the glass forming process. The systems and methods of the present disclosure may provide non-contact, direct heating of the streak area without changing the temperature of surrounding glass or causing damage to the glass forming apparatus. The systems and methods of the present application may reduce severity of streak without introducing heat or changing the viscosity of the glass beyond the region of the streak. The systems of the present disclosure are simple in construction, are cost effective, and include few moving parts, which may make the systems reliable and easy to maintain. The components of the systems are compact and lightweight and can fit into many locations on the glass forming apparatus. The systems can work with a small optical access footprint and can be mounted to existing muffle designs for fusion draw and slot draw apparatus without substantial modifications. The system can also be hot installable on existing muffles while the glass ribbon 12 is being produced and without shutting down the glass forming process, among other features.

Figure 3:
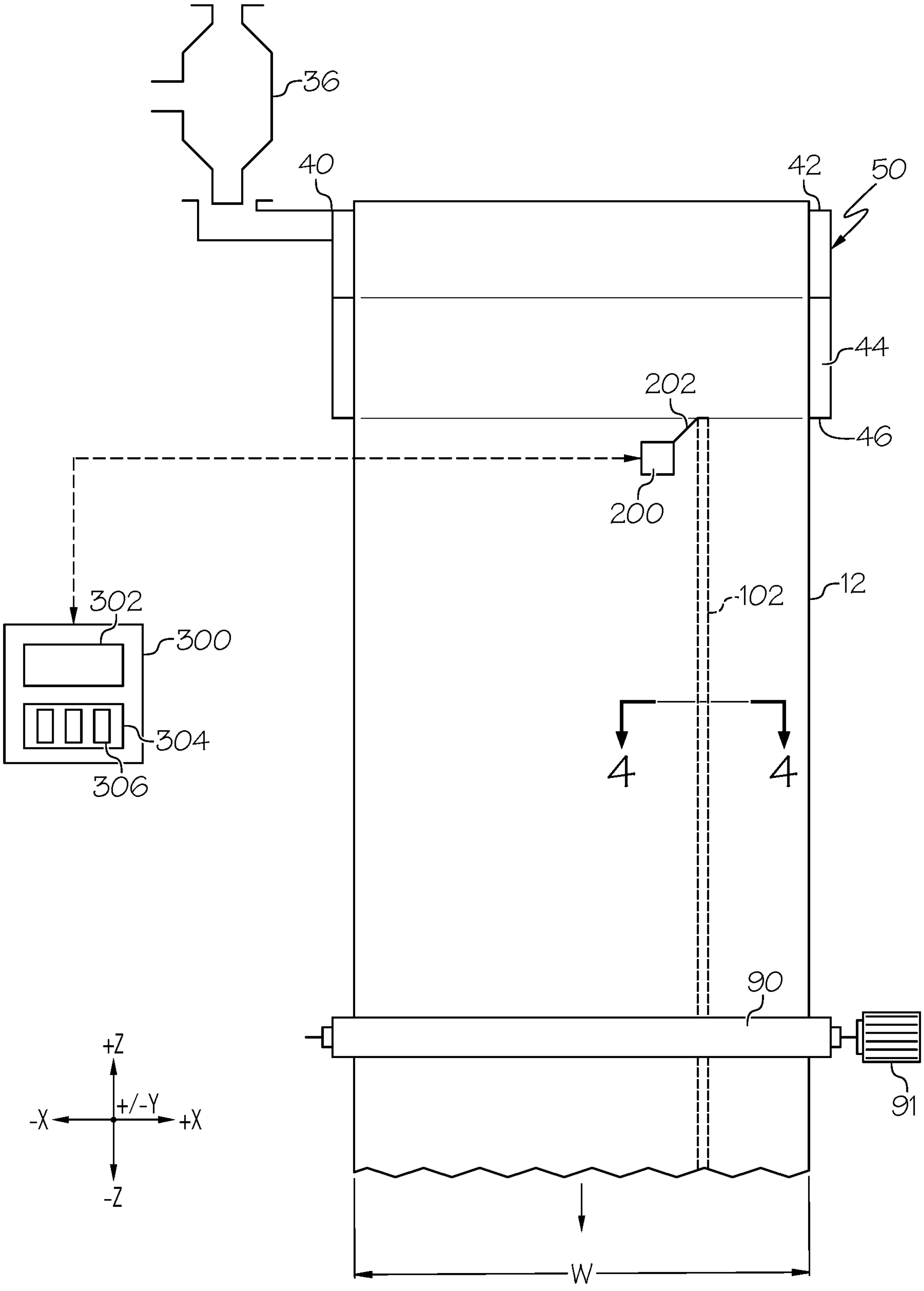
FIG. 3 schematically depicts a side view of a glass forming process and a system for remediating streak, according to one or more embodiments shown and described herein.

Referring now to FIG. 6, one embodiment of a system 200 for remediating streak in a glass ribbon 12 produced by a glass forming apparatus 10, such as but not limited to a fusion downdraw process, fusion updraw process, slot draw process, or redraw process, is schematically depicted. The system 200 includes a heating laser 210 that produces a laser beam 202 and one or more optical components 220 configured to change one or more properties of the laser beam 202, direct the laser beam 202 at the location of the streak 102, or both. The optical components 220 may collimate, expand, or focus the laser beam 202. In embodiments, the optical components 220 may include a collimating lens operable to convert the laser beam 202 to a collimated laser beam. The heating laser 210 and optical components 220 may be positionable to direct the laser beam 202 at the glass ribbon 12 or a portion of the glass ribbon 12 (e.g., first half ribbon 62, second half ribbon 82, or both) at the location of the streak 102 (FIG. 3). The system 200 may be operable to direct the laser beam 202 at the glass ribbon 12, or portion thereof, at the location of the streak 102 to provide high-resolution heating of the glass ribbon 12, or portion thereof, at the location of the streak 102. High-resolution heating refers to targeted heating of the glass ribbon 12, first half ribbon 62, second half ribbon 82, or combinations thereof over a width region that is less than or equal to about 50 mm, less than or equal to about 40 mm, less than or equal to about 30 mm, or even less than or equal to about 20 mm in width (e.g., in the +/−X direction). The high resolution heating of the glass ribbon 12, first half ribbon 62, or second half ribbon 82 at the location of the streak 102 may locally decrease the viscosity of the glass at the streak, which may cause the streak to be at least partially improved (e.g., reduce the severity of the streak by reducing the rate of change in the thickness of the glass ribbon 12 at the location of the streak).

The heating laser 210 is a device capable of generating the laser beam 202. The laser beam 202 may be a single round laser beam or single elliptical-shaped laser beam. The laser beam 202 produced by the heating laser 210 may be a stationary laser beam, meaning that the laser beam 202 propagates along a fixed beam pathway, which may be determined by the positioning of the heating laser 210 and the optical components disposed down beam from the heating laser 210.

The laser beam 202 may have a wavelength in a wavelength range that allows the laser beam 202 to be absorbed by the glass to heat the glass of the glass ribbon 12, first half ribbon 62, or second half ribbon 82 and does not pass through the glass to impinge on the glass forming apparatus 10. Because silicate-based glasses have strong absorption of light having wavelengths greater than or equal to about 4 micrometers (μm), many different laser sources can be used as the heating laser 210 to produce the laser beam 202 for heating the glass ribbon 12 or half ribbon at the location of the streak 102. The heating laser 210 may be operable to produce the laser beam 202 having a wavelength in the infrared wavelength region. The heating laser 210 may be operable to produce the laser beam 202 having a wavelength of greater than or equal to about 1 μm, greater than or equal to about 2 μm, greater than or equal to about 3 μm, greater than or equal to about 4 μm, or even greater than or equal to about 8 μm. The heating laser 210 may be operable to produce the laser beam 202 having a wavelength of less than or equal to about 12 μm, or even less than or equal to about 10 μm. The heating laser 210 may be operable to produce the laser beam 202 having a wavelength of from about 1 μm to about 12 μm, from about 1 μm to about 10 μm, from about 2 μm to about 12 μm, from about 2 μm to about 10 μm, from about 3 μm to about 12 μm, from about 3 μm to about 10 μm, from about 4 μm to about 12 μm, from about 4 μm to about 10 μm, from about 8 μm to about 12 μm, or from about 8 μm to about 10 μm.

The heating laser 210 may be a CO laser, a CO2 laser, a quantum cascade laser (QCL), or other type of suitable laser. In particular, the heating laser 210 may include, but is not limited to, one or more CO lasers operating at 5.6 μm wavelength: CO2 lasers operating at wavelengths from 9 μm to 11.2 μm, such as wavelengths of 9.3 μm, 9.6 μm, 10.6 μm, or 11.2 μm: or low power quantum cascade lasers (QCL), which can emit across the mid- to far-infrared (FIR) spectrum (3 to 12 microns). In embodiments, the heating laser 210 may be a QCL with an emitting wavelength of from about 3 μm to 12 μm, or even from about 8 μm to about 12 μm, considering atmospheric transmission and glass absorption characteristics. The heating laser 210 may be operable to produce the laser beam 202 that is continuous or pulsed. Continuous lasers have generally have lower peak power and raise the glass surface temperature gradually, while pulsed lasers generally have high peak power and raise glass surface temperature to a to a greater degree in the shorter period of time compared to continuous lasers. The laser beam may be collimated or un-collimated. In embodiments, the laser beam 202 produced by the heating laser 210 may be a collimated laser beam. In embodiments, the laser beam 202 may be collimated using a collimating lens disposed down beam from the heating laser 210, as further discussed herein.

The heating laser 210 has a power sufficient to heat the glass ribbon 12, first half ribbon 62, or second half ribbon 82 at the location of the streak 102. The power required may depend on the glass absorption at the wavelength of the laser beam 202 and whether the laser beam 202 is directed at the glass ribbon 12 or at the first half ribbon 62 or second half ribbon 82 while they are still in contact with forming body 50 or other component of the glass making apparatus. Thus, the power of the laser beam 202 may be characterized by the linear average power density. The linear average power density Ps of the laser beam 202 refers to a range of absorbed laser power P for streak remediation. The linear average power density Ps can be calculated according to the following Equation 1 (EQU 1).

$$P_S = \frac{P}{W_S} \qquad \text{EQU. 1}$$

The laser beam 202 produced by the heating laser 210 may have a linear average power density sufficient to heat the glass ribbon 12 at the location of the streak 102 in order to remediate the streak 102. In embodiments, the laser beam 202 may have a linear average power density of from about 10 milliwatts per millimeter (mW/mm) to about 10 watts per millimeter (W/mm).

The heating laser 210 may have an absolute linear average power of from about 0.001 W/mm to about 10 KW/mm, depending on the wavelength of the laser beam 202. If the power or linear average power density of the laser beam 202 is too little, then the energy of the laser beam 202 may be insufficient to heat the glass enough to remediate the streak 102. If the power or linear average power density of the laser beam 202 is too great, the laser beam 202 may overheat the streak 102 and/or heat an area of the glass ribbon 12, first half ribbon 62, or second half ribbon 82 greater than the region of the streak 102, which may create additional physical defects in the glass. The power of the heating laser 210 may be adjusted to adjust the amount of heating of the glass by the laser beam 202. The heating laser 210 may be communicatively coupled to a control system 300 through wired or wireless communication pathways. Communication between the heating laser 210 and the control system 300 may enable control of the heating laser 210 and the power output thereof based on one or more measured parameters of the system 200, the glass ribbon 12, or both.

The heating laser 210 produces the laser beam 202 having a beam width sufficient to heat the glass of the glass ribbon 12, first half ribbon 62, or second half ribbon 82 at the location of the streak 102 without overheating the regions of the glass ribbon 12, first half ribbon 62, or second half ribbon 82 beyond the region of the streak 102. The beam width of the laser beam 202 refers to the $1/e^2$ width of the laser beam 202 determined at the location along the beam path where the laser beam 202 is incident on the surface of the glass. The $1/e^2$ width of the laser beam 202 refers to the distance between the two points of the beam where the intensity of the light of the laser beam 202 falls below the value of $1/e^2$ (0.135) times the maximum intensity in the intensity distribution of the laser beam 202. In embodiments, the laser beam 202 produced by the heating laser 210 may have a beam width that is within about 50% of the streak width Ws, such as within about 25% or even within about 10% of the beam width Ws. In other words, the laser beam 202 may have a beam width such that an absolute value of the difference between the beam width and the streak width Ws is less than about 50% of the streak width Ws, such as less than or equal to about 25% or even less than or equal to about 10% of the streak width Ws. In embodiments, the laser beam 202 may have a beam width of less than or equal to about 50 mm. The laser beam 202 may have a beam width that is less than or equal to about 40 mm, less than or equal to about 30 mm, less than or equal to about 20 mm, or even less than or equal to about 10 mm. The laser beam 202 may have a beam width that is greater than zero, such as greater than or equal to about 1 mm, or even greater than or equal to about 5 mm. In embodiments, the laser beam 202 may have a beam width of from greater than zero to about 50 mm, such as from about 0.1 mm to about 50 mm, from about 0.1 mm to about 40 mm, from about 0). 1 mm to about 30 mm, from about 0.1 mm to about 20 mm, from about 0.1 mm to about 10 mm, from about 0.5 mm to about 50 mm, from about 0.5 mm to about 40 mm, from about 0.5 mm to about 30 mm, from about 0.5 mm to about 20 mm, from about 0.5 mm to about 10 mm, from about 1 mm to about 50 mm, from about 1 mm to about 40 mm, from about 1 mm to about 30 mm, from about 1 mm to about 20 mm, from about 5 mm to about 50 mm, from about 5 mm to about 40 mm, from about 5 mm to about 30 mm, or from about 5 mm to about 20 mm. The beam width of the laser beam 202 may be modified by including optical components to focus (converge) or defocus (diverge) the laser beam 202.

The laser beam 202 can be shaped to further reduce glass thickness variation at the location of the streak 102. The beam shape of the laser beam 202 refers to the cross-sectional shape of the laser beam 202 at the location along the beam path where the laser beam 202 is incident on the surface of the glass ribbon 12, first half ribbon 62, or second half ribbon 82. The laser beam 202 can have a beam shape that is generally circular in cross-section. In embodiments, the laser beam 202 may have a beam shape that is elliptical in cross-section. In addition to the beam shape, the laser beam 202 may have an intensity distribution that may be adjusted to further reduce glass thickness variation. The intensity distribution of the laser beam 202 refers to the intensity of the light of the laser beam 202 as a function of the position within the cross-section of the beam shape of the laser beam 202. In embodiments, the laser beam 202 may have an intensity distribution that resembles a Gaussian distribution. In embodiments, the laser beam 202 may have a top hat intensity distribution where the intensity of the light of the laser beam 202 is generally constant over the entire beam shape, such that a two dimensional graph of intensity as a function of radius from the center of the laser beam 202 resembles the shape of a top hat, e.g., a step function. The beam shape and intensity distribution of the laser beam 202 can be modified based on the thickness profile of the glass ribbon 12 along the streak width Ws of the streak 102. Changing the beam shape and intensity distribution of the laser beam can be accomplished using diffractive optical components, for example.

Referring again to FIG. 6, the system 200 for remediating streak may include optical components 220 configured to change one or more properties of the laser beam 202 or change a beam path of the laser beam 202. The optical components 220 may include various lenses, mirrors, beam splitters, prisms, filters, or other optical components operable to change the properties or beam path of the laser beam 202. The optical components 220 may include a collimating lens that may be configured to convert the laser beam 202 from the heating laser 210 into a collimated laser beam. In embodiments, the collimating lens may be a ZnSe collimating lens. The collimating lens may be disposed down beam relative to the heating laser 210, such as between the heating laser 210 and the glass ribbon 12. The optical components 220 may further comprise one or more focusing lenses, diverging lenses, and/or mirrors (not shown) to focus, expand, and/or direct, respectively, the laser beam 202 to the streak 102 location.

The system 200 for remediating streak 102 may further comprise one or more beam splitters 230. The term "beam splitter" refers to an optical component that divides a single laser beam into two or more separate beam pathways (e.g., one or more stationary beams). The beam splitter 230 may be a prism, one or more diffractive optical components, an axicon, or other device configured to divide the laser beam 202 into at least two separate beams. Referring again to FIG. 6, the beam splitter 230 may be operable to divide the laser beam 202 into a passthrough portion 232 of the laser beam 202 and a measurement portion 234 of the laser beam 202. In embodiments, the beam splitter 230 may be positioned down beam relative to the collimating lens such that the beam splitter 230 divides the laser beam 202 into the passthrough portion 232 and the measurement portion 234 after the laser beam 202 has been collimated. The system 200 may further include one or more other focusing lenses, diverging lenses, shaping lenses, mirrors, beam splitters, filters, prisms, diffractive optical components, axicons, etc. for changing properties of the laser beam 202 or modifying the beam path of the laser beam 202.

The heating laser 210 may be mounted to a fixture (not shown) attached to the glass forming apparatus 10, such as to a fusion draw machine embodying the fusion draw process or a slot draw apparatus embodying a slot draw process, or other glass forming apparatus. In embodiments, the heating laser 210 and optical components 220 may be mounted to a muffle (not shown) of the glass forming apparatus 10. The muffle may be an insulating shroud that envelops some or all of the glass forming apparatus 10, such as fusion draw process, in particular the forming body 50 and glass ribbon 12 produced therefrom, or other glass forming apparatus. The fixture may be operable to position the heating laser 210, optical components 220, and beam splitter 230 in the vertical direction (e.g., in the +/−Z direction of the coordinate axis in FIGS. 1-6) and/or in the horizontal direction (e.g., in the +/−X direction and/or +/−Y direction of the coordinate axis in FIGS. 1-6). The heating laser 210 and optical components 220 may be positioned in the width direction (e.g., +/−X direction) so that the laser beam 202 is incident on the glass ribbon 12, first half ribbon 62, or second half ribbon 82 at or near the location of the streak 102.

Referring again to FIG. 6, the heating laser 210, optical components 220, and beam splitter 230 may be positioned vertically to direct the laser beam 202 at the glass ribbon 12, first half ribbon 62, or second half ribbon 82 at a vertical position (i.e., position in the +/−Z direction of the coordinate axis in FIG. 6) where the glass has a viscosity in the working range of from about $10^4$ poise to about $7.6\times10^{7.6}$ poise. In this viscosity range of the glass, the heating caused by the laser beam 202 may be effective to heat the glass to reduce the viscosity of the glass to the point where the glass is able to thin or relax under tension to remediate the streak 102. As shown in FIG. 6, in embodiments, the glass forming process may be a fusion downdraw process, and the heating laser 210, optical components 220, and beam splitter 230 may be positioned vertically to direct the laser beam 202 at the first half ribbon 62 or the second half ribbon 82 at a position vertically above the root 46 of the forming body 50 (i.e., in the +Z direction of the coordinate axis in FIG. 15 relative to the root 46), which is before the first half ribbon 62 and second half ribbon 82 are fused to form the glass ribbon 12. Although shown in FIG. 6 as being directed to the first half ribbon 62, the laser beam 202 may be directed at the first half ribbon 62, the second half ribbon 82, or both, depending on the suspected source of the streak 102.

Figure 15:
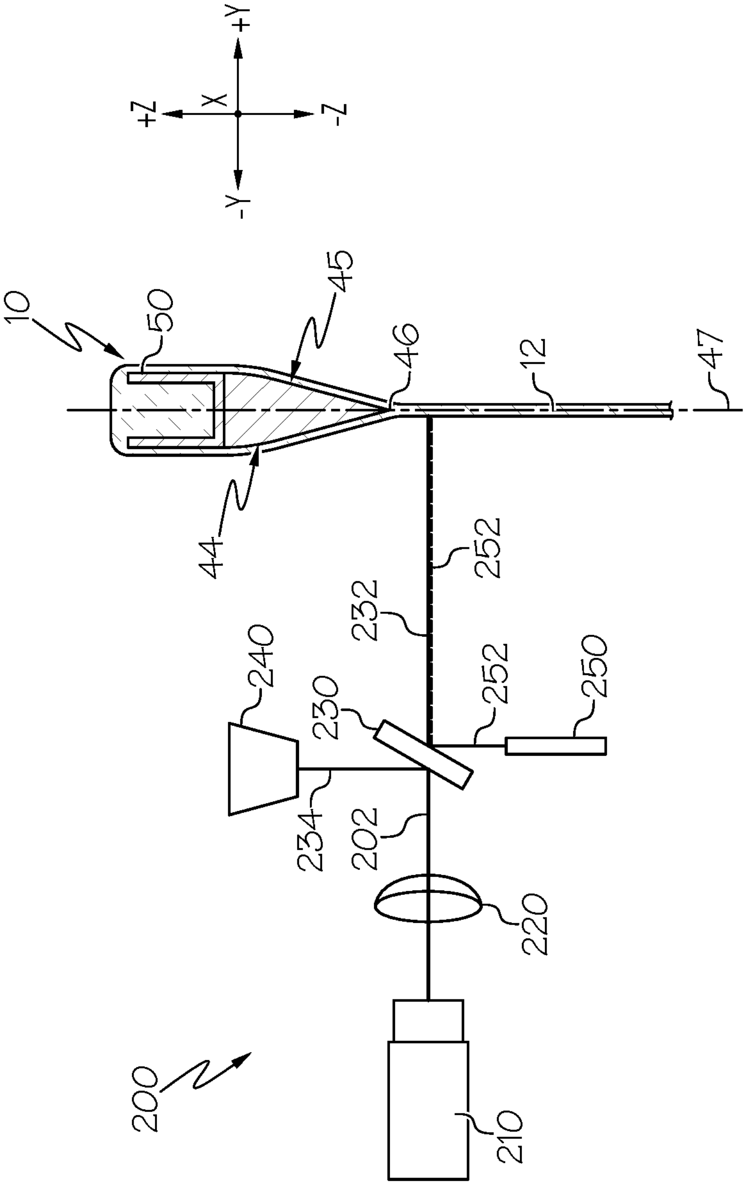
FIG. 15 schematically depicts a system for remediating streak where the laser beam is directed to at the glass ribbon vertically below the root, according to one or more embodiments shown and described herein.
Figure 16:
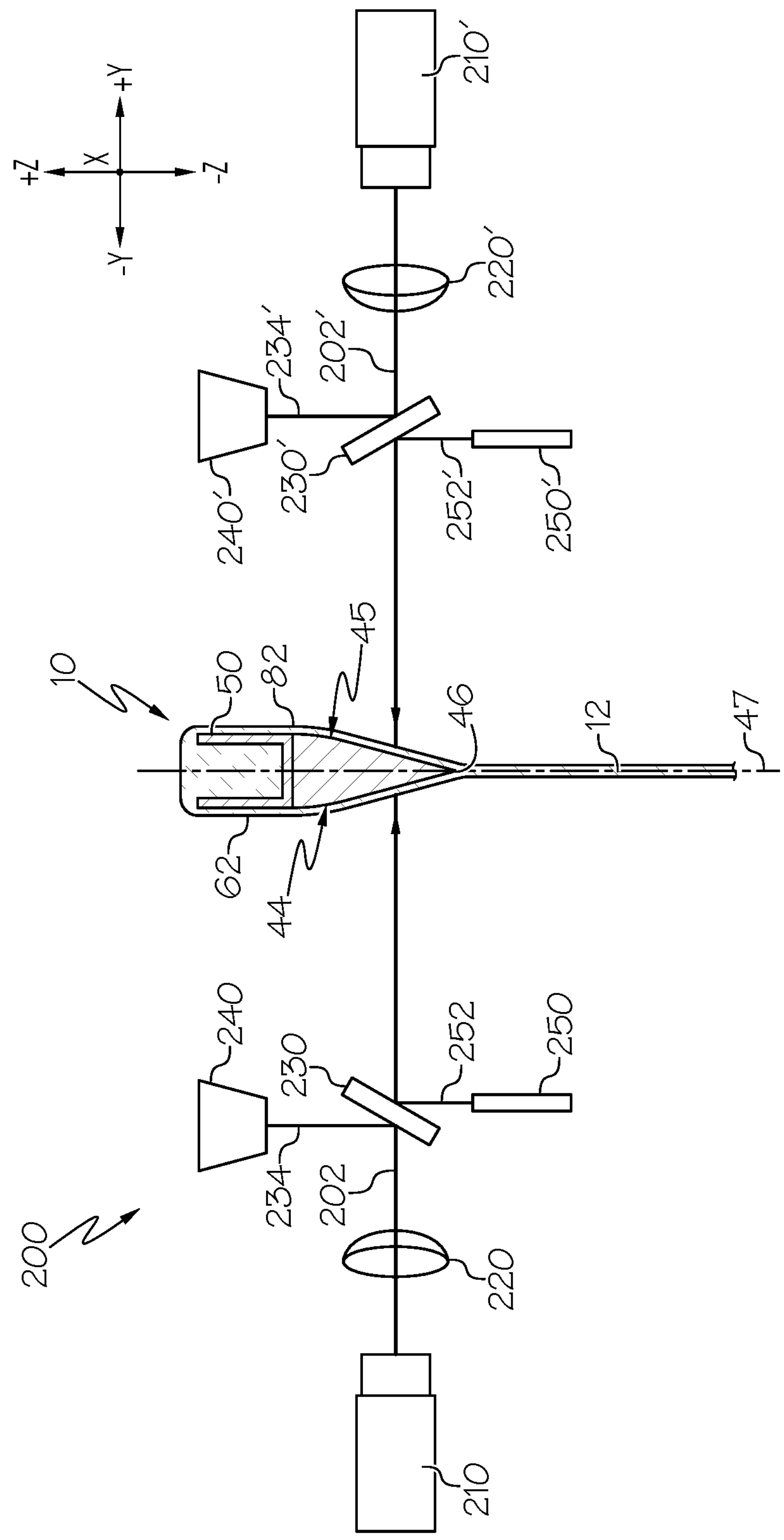
FIG. 16 schematically depicts a system for remediating streak comprising two heating lasers with one on each side of the forming body, according to one or more embodiments shown and described herein.

Referring now to FIG. 15, in some embodiments, the glass forming process may be a fusion down draw process, and the heating laser 210, optical components 220, and beam splitter 230 may be positioned vertically to direct the laser beam 202 at the glass ribbon 12 at a position vertically below the root 46 of the forming body 50 (i.e., in the −Z direction of the coordinate axis in FIG. 15 relative to the root 46). Referring now to FIG. 16, in embodiments, the glass forming process may be a fusion down draw process, and the system 200 may include one heating lasers 210, optical components 220, and beam splitter 230 positioned to direct the laser beam 202 at the streak location on the first half ribbon 62 above the root 46 and another heating laser 210', optical components 220', and beam splitter 230' positioned to direct another laser beam 202' at the streak location on the second half ribbon 82 above the root 46.

Referring again to FIG. 6, in embodiments, the system 200 may further include at least one power detector 240. The power detector 240 may be operable to measure a power of the laser beam 202 and output a signal indicative of the power of the laser beam 202. The power detector 240 may be any device capable of absorbing a laser beam and generating a power signal indicative of the power of the laser beam being measured. The power signal may be digital or analog and may be able to be propagated through any wired or wireless communication method or medium. The at least one beam splitter 230 may be operable to direct the measurement portion 234 of the laser beam 202 to the power detector 240. In embodiments, the power detector 240 may be positioned to receive the measurement portion 234 of the laser beam from the beam splitter 230. The power detector 240 may be communicatively coupled to the control system 300 through wired or wireless communication pathways. The power signal generated by the power detector 240 may be communicated to the control system 300. In embodiments, the power signal generated by the power detector 240 may be used in feedback control of the output power of the heating laser 210.

Referring again to FIG. 6, in embodiments, the system 200 may further include a sight laser 250. As used herein, the term “sight laser” refers to a low power laser producing a sight laser beam that is visible human beings and can be directed along the same beam path as the laser beam 202 for purposes of providing a visual indication of the location of the laser beam. The sigh laser 250 may be operable to produce a sight laser beam 252 having a low power and a wavelength in the visible spectrum, such as a wavelength of from 380 nm to 700 nm. The laser beam 202 may have a wavelength in the infrared region and may not be visible to the human eye. This may make it difficult to determine where the laser beam 202 is incident on the glass ribbon 12. The sight laser beam 252 may be used to confirm the location at which the laser beam 202 is incident on the glass ribbon 12 and/or on the forming body 50 (e.g., on the first forming surface 44 or second forming surface 45 of the forming body 50). The sight laser beam 252 may be directed along the same beam pathway as the laser beam 202 so that the beam path of the sight laser beam 252 is collinear with the beam path of the laser beam 202. In embodiments, the sight laser beam 252 may be directed by one or more optical components to be coaxial and/or collinear with the laser beam 202.

The sight laser beam 252 may have a wavelength that is in the visible spectrum. The sight laser 250 may be a laser capable of producing a sight laser beam 252 having a wavelength in a range of from about 400 nm to about 700 nm. In embodiments, the sight laser beam 252 may have a wavelength of less than about 550 nm, such as from about 400 nm to about 550 nm. When the wavelength is greater than about 550 nm, the sight laser beam 252 may be more difficult to observe against light emitted from the molten glass and forming body 50. In embodiments, the sight laser 250 may be a low power green laser producing a sight laser beam 252 having a wavelength of from about 500 nm to about 550 nm.

The system 200 may further include sight laser optical components (not shown) arranged to direct the sight laser beam 252 along the same beam pathway as the laser beam 202. In embodiments, the sight laser optical components may include the beam splitter 230. In embodiments, the beam splitter 230 may be operable to reflect the sight laser beam 252 along the beam path of the laser beam 202, such as the beam path of the passthrough portion 232 of the laser beam 202.

Referring again to FIGS. 3-6, operation of the system 200 for remediating streak 102 will now be described in further detail. Referring to FIG. 3, the glass forming apparatus 10 may be operated to form the glass ribbon 12 through the fusion draw process. During the glass forming process, the glass ribbon 12 may be maintained under tension using the pulling rollers 90. Maintaining the glass ribbon 12 under tension during remediation of the streak 102 may create tensile force in the glass that may cause the glass to thin when heated with the laser beam 202. Referring to FIG. 5, one or more streak 102 features on the glass ribbon 12 may be identified by the streak inspection system 108. The system 200 may then be operated to direct the laser beam 202 or any portions thereof (e.g., the passthrough portion 232 of the laser beam 202) at the location of the streak 102. The laser beam 202 may pass through one or a plurality of optical components 220, such as but not limited to a collimating lens, the beam splitter 230, or other optical component, that may change the properties and/or beam path of the laser beam 202.

Figure 7A:
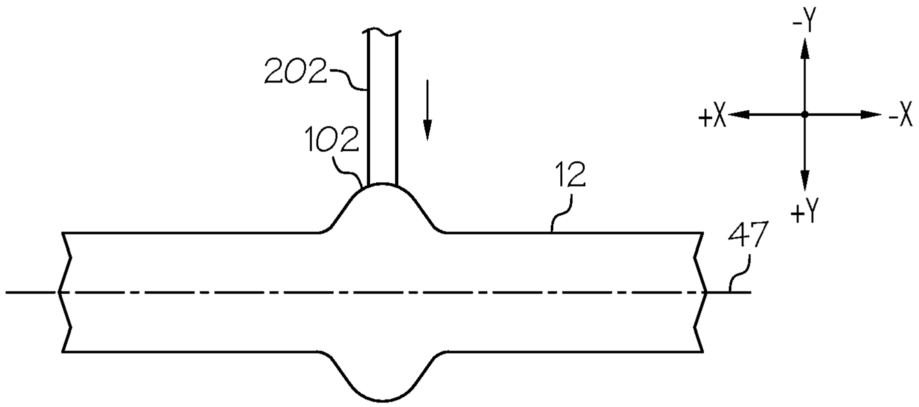
FIG. 7A schematically depicts operation of the system of FIG. 6 to remediate a streak comprising a protrusion extending outward from the glass ribbon, according to one or more embodiments shown and described herein.
Figure 7B:
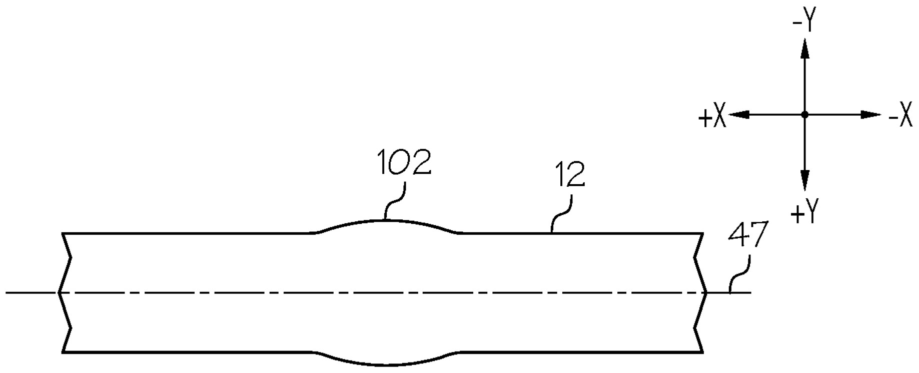
FIG. 7B schematically depicts the glass ribbon of FIG. 7A following treatment of the streak with a laser beam of the system of FIG. 6, according to one or more embodiments shown and described herein.

Referring now to FIGS. 7A and 7B, treatment of a streak 102 comprising a protrusion, where the glass thickness increases at the streak 102, will be described. As shown in FIG. 7A, the laser beam 202 is directed at the thickest portion of the streak 102. The laser beam 202 or portions thereof incident on the streak 102 heat the glass ribbon 12 or portion thereof at the location of the streak 102. Targeted high-resolution (e.g., <50 mm in width) heating of the glass ribbon 12, first half ribbon 62, or second half ribbon 82 at the location of the streak 102 with the laser beam 202 or any portions thereof reduces the viscosity of the glass, which causes the glass to thin under tension. Referring now to FIG. 7B, the thinning of the glass may reduce the thickness of the glass ribbon 12 at the location of the streak 102, the rate of change in the thickness of the glass ribbon 12 at the location of the streak 102, or both. As shown in FIG. 7B, the rate of change in the thickness over the width of the streak 102 is reduced compared to the streak 102 prior to treatment (FIG. 7A). Thus, by directing the laser beam 202 or any portions thereof at the streak 102 feature, adjusting the laser power, and maintaining the glass ribbon 12 under tension, the streak 102 can be removed or significantly reduced.

Figure 8A:
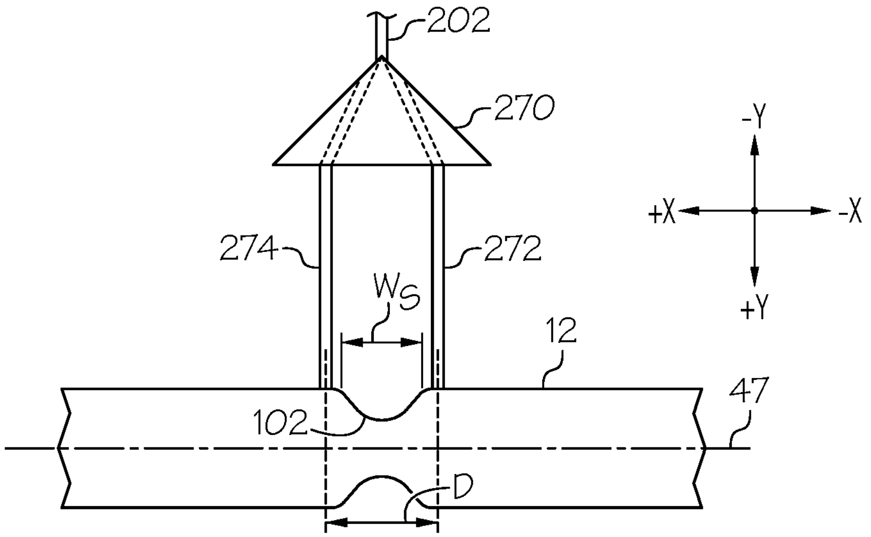
FIG. 8A schematically depicts operation of a system of the present disclosure to remediate a streak comprising a recess extending inward into the glass ribbon, according to one or more embodiments shown and described herein.
Figure 8B:
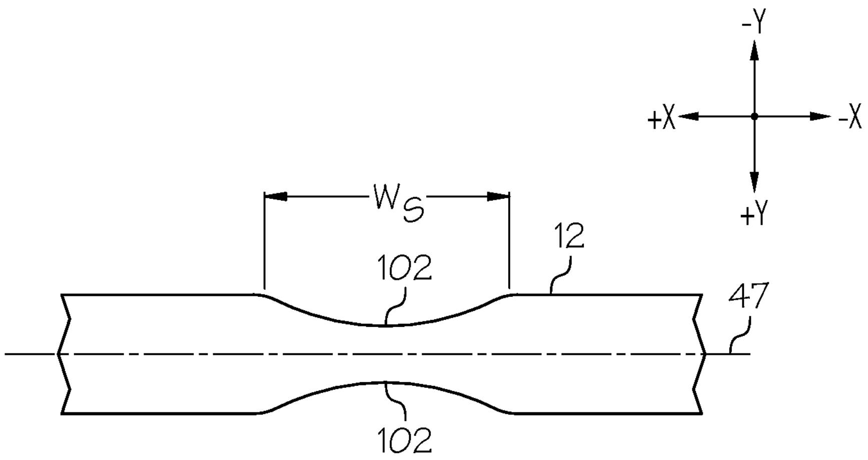
FIG. 8B schematically depicts the glass ribbon of FIG. 8A following treatment of the streak with a laser beam of the system, according to one or more embodiments shown and described herein.

Referring now to FIGS. 8A and 8B, treatment of a streak 102 comprising a recess, where the glass thickness decreases at the streak 102, will be described. For a recess-type streak, directing the laser beam 202 at the center of the streak 102, as shown in FIG. 7A, further thins the glass at the center of the streak 102, which increases the severity of the recess-type streak 102. Instead, for a recess streak, the laser beam 202 is directed to one or both edges of the streak 102 or regions of the glass ribbon 12, first half ribbon 62, or second half ribbon 82 just beyond the streak 102. Directing the laser beam 202 at one or more locations proximate the outer edges of the streak 102 may thin the glass ribbon 12 at the edges of the streak 102. This thinning at the edges makes the streak 102 wider (i.e., increases the streak width Ws), which distributes the change in thickness over a greater distance and reduces the slope of the change in thickness of the glass ribbon 12 in the area of the streak 102.

Referring to FIG. 8A, the system 200 can include a second beam splitter 270 operable to divide the laser beam 202 into a first beam 272 and a second beam 274. Further description of the system 200 having a second beam splitter 270 is provided in relation to FIG. 10. As shown in FIG. 8A, the second beam splitter 270) may be sized and configured to separate the laser beam 202 so that the first beam 272 and second beam 274 are separated by a distance D. The distance D is the center-to-center distance between the first beam 272 and the second beam 274. The distance D is sufficient so that an absolute value of the difference between the distance D and the full width half maximum of the streak 102 is less than about 100%, less than or equal to about 75%, less than or equal to about 50%, less than or equal to about 40%, less than or equal to about 30%, less than or equal to about 20%, less than or equal to about 10%, or even less than or equal to about 5% of the full width half maximum of the streak 102. The distance D may be less than or equal to about 50 mm, or less than or equal to about 40 mm for treatment of a recess-type streak 102. The distance D between the first beam 272 and the second beam 274 and the positioning of the first beam 272 and second beam 274 relative to the recess-type streak 102 may be determined by the shape profile of the glass ribbon 12 in the location of the recess-type streak 102. The first beam 272 and the second beam 274 may be directed to the outer regions of the recess-type streak 102 or just beyond the streak 102. The first beam 272 and second beam 274 may produce targeted high-resolution heating (e.g., <50 mm in width) of the glass ribbon 12 proximate to the outer edges of the recess-type streak 102. This targeted heating may reduce the viscosity of the glass proximate the edges of the recess-type streak 102 and can cause the glass to thin at the outer edges of the streak 102. The thinning of the glass may cause local thinning of the glass ribbon 12 at the edges of the recess-type streak, which may increase the streak width Ws, thereby distributing the total change in thickness of the glass over a greater width of the glass ribbon 12. Thus, the change in thickness as a function of width is decreased, reducing the severity of the streak 102.

Through conservation of matter, some of the glass may displace or move towards the center of the streak, which can cause some local thickening of the glass at the center of the recess-type streak 102, further reducing the rate of change of the thickness of the glass in the region of the recess-type streak 102. Referring now to FIG. 8B, the glass ribbon 12 following treatment of the recess-type streak 102 with the first beam 272 and the second beam 274 is schematically depicted. As shown in FIG. 8B, treatment with the first beam 272 and the second beam 274 at the outer edges of the recess-type streak 102 can reduce the rate of change in the thickness as a function of width, thereby reducing the severity of the recess-type streak 102. Although shown and described in terms of splitting the laser beam 202 into two separate beams, in embodiments, the severity of a recess-type streak 102 may be reduced by directing a laser beam 202 at a single position proximate one of the edges of the streak 102. In some cases, heating the glass ribbon 12, first half ribbon 62, or second half ribbon 82 with the laser beam 202 proximate only one edge may be sufficient to widen the streak 102 to reduce the change in the thickness as a function of width over the location of the streak 102.

The laser beam 202, or any portions thereof, is maintained in contact with the streak 102 feature for continuous production of the glass ribbon 12. Additionally, operation of the system 200 may include locating the laser beam 202 or any portions thereof with a sight laser beam 252 reflected along the beam pathway of the laser beam 202. In embodiments, the beam splitter 230 may be operable to direct the sight laser beam 252 along the beam pathway of the laser beam 202 or portion thereof, where the sight laser 252 is operable to show a position of the laser beam 202 or any portion thereof on the glass ribbon 12.

The system 200 is initially set-up upon identifying a streak 102 of the glass ribbon 12. Setting-up the system 200 may include directing the laser beam 202 at the glass ribbon 12, first half ribbon 62, or second half ribbon 82 at a location at least in the general area of the streak 102. The laser beam 202 may initially have a first power level that is sufficient to produce a change in the thickness of the glass ribbon 12. In embodiments, the first power level of the laser beam 202 may be greater than or equal to about 0.5 W. The location where the laser beam 202 is incident on the glass ribbon 12, first half ribbon 62, or second half ribbon 82 may be identified by measuring the change in thickness of the glass ribbon 12 in response to the laser beam 202. At the location where the laser beam 202 is incident on the glass, the laser beam 202 heats the glass, which causes the thickness profile of the glass ribbon 12 to change at the location of laser beam 202. Thus, the change in the thickness of the glass ribbon 12 can provide an indication of the location where the laser beam 102 is contacting the glass ribbon 12, first half ribbon 62, or second half ribbon 82. Once the location of the laser beam 202 is identified, the position of the heating laser 210 and/or optical components 220 can then be adjusted to position the laser beam 202 at the location of the streak 102. The power of the laser beam 202 may be reduced to a second power level less than the first power level. The second power level of the laser beam 202 may be sufficient to remediate the streak 102. The position and power of the heating laser 210 may be adjusted to fine tune the laser beam 202 based on the severity and thickness profile of the streak 102. One or more of the power, position, beam width, beam shape, beam intensity distribution, or combinations of these of the laser beam 202 may be adjusted depending on the width, severity, thickness profile, and location of the streak 102.

As previously discussed, the beam shape, intensity distribution, or both of the laser beam 202 may be modified to adjust the heating obtained by the laser beam 202 based on the width, severity, shape, and location of the streak 102. The system 200 may further comprise diffractive optical components or other optical components operable to change the beam shape, intensity distribution, or both of the laser beam 202. Operation of the system 200 may further include determining one or more of the width, severity, and/or shape (thickness profile) of the glass ribbon 12 at the location of the streak 102 and modifying the beam shape, intensity distribution, or both of the laser beam 202 based on the width, severity, and/or shape (thickness profile) of the glass ribbon 12 at the location of the streak 102. In embodiments, the laser beam 202 may have a top-hat intensity distribution or Gaussian intensity distribution. As used herein, a "top-hat" intensity distribution refers to an intensity distribution in which the light intensity is generally constant over the cross-sectional area of the laser beam, such as the light intensity being within 10% of the average light intensity over the cross-sectional area of the laser beam. For a Gaussian intensity distribution, the light intensity is greatest at the center of the laser beam and decreases with increasing distance from the center of the laser beam.

In embodiments, the system 200 may include a flexible laser beam delivery system that can deliver the laser beam 202 from the heating laser 210 to the fixture coupled to the glass forming apparatus 10. The flexible laser beam delivery system may be a fiber optic cable system or an articulated arm laser beam delivery system. The flexible laser beam delivery system may enable the heating laser 210 to be positioned at a location remote from the glass forming apparatus 10. This may enable the system 200 to be used to deliver the laser beam 202 to locations where space constraints make it difficult to position the heating laser 210 close to the glass ribbon 12, first half ribbon 62, or second half ribbon 82.

Figure 9:
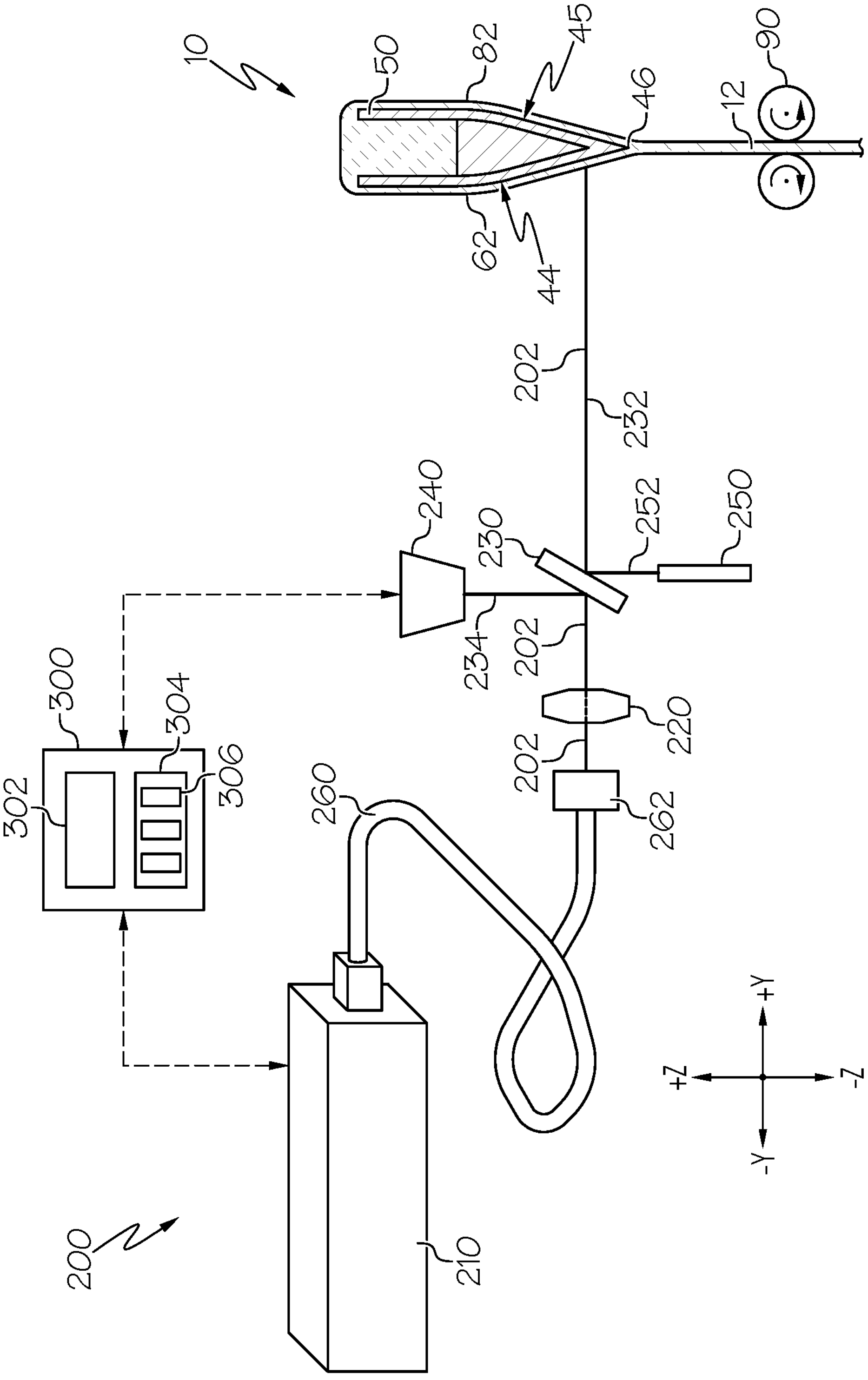
FIG. 9 schematically depicts another system for remediating streak comprising a laser and a fiber optic cable, according to one or more embodiments shown and described herein.

Referring now to FIG. 9, in embodiments, the system 200 may include the heating laser 210 mounted remote from the glass forming apparatus 10 and a fiber optic cable 260 configured to deliver the laser beam 202 from the heating laser 210 to a location proximate the glass forming apparatus 10 and/or glass ribbon 12. Mounting the heating laser 210 remote from the glass forming apparatus 10 refers to mounting the heating laser 210 out of a line-of-sight from the glass ribbon 12 or spaced apart from the glass ribbon 12 by a distance away from the glass forming apparatus 10 where the distance is great enough that the heating laser 210 cannot be efficiently directed to the glass ribbon 12 or half ribbons using optical components open to the atmosphere without frequent disruptions of the beam pathway. The fiber optic cable 260 may be operatively coupled to the heating laser 210 and may extend from the heating laser 210 to a position proximate the glass ribbon 12, first half ribbon 62, or second half ribbon 82. The fiber optic cable 260 may be a hollow core fiber optic cable or a polycrystalline fiber optic cable.

The system 200 may further include a fiber optic connector 262 that may be coupled to the end of the fiber optic cable 260 opposite from the heating laser 210. The fiber optic connector 262 may be configured to transition the laser beam 202 from the fiber optic cable 260 into the atmosphere. The fiber optic connector 262 may be positioned to direct the laser beam 202 at the glass ribbon 12, first half ribbon 62, or second half ribbon 82. The fiber optic connector 262 may be positionable relative to the glass ribbon 12, first half ribbon 62, or second half ribbon 82 in the vertical direction (e.g., in the +/−Z direction of the coordinate axis in FIG. 9) and in the horizontal direction (e.g., in the +/−X direction and/or +/−Y direction of the coordinate axis in FIG. 9). In embodiments, the fiber optic connector 262 may be coupled to a fixture (not shown). The fixture may be operable to position the fiber optic connector 262, optical components 220, and beam splitter 230 in the vertical direction (e.g., in the +/−Z direction of the coordinate axis in FIG. 9) and/or in the horizontal direction (e.g., in the +/−X direction and/or +/−Y direction of the coordinate axis in FIG. 9). The fiber optic connector 260, optical components 220, and beam splitter 230 may be positioned in the width direction (e.g., +/−X direction) so that the laser beam 202 is incident on the glass ribbon 12, first half ribbon 62, or second half ribbon 82 at or near the location of the streak 102. The fiber optic connector 262, optical components 220, and beam splitter 230 may be positioned vertically to direct the laser beam 202 at the glass ribbon 12, first half ribbon 62, or second half ribbon 82 at a vertical position (i.e., position in the +/−Z direction of the coordinate axis in FIG. 9) where the glass has a viscosity in the working range of $10^4$ poise to $7.6\times10^{7.6}$ poise. In this viscosity range of the glass, the heating caused by the laser beam 202 may be effective to heat the glass to reduce the viscosity of the glass to the point where the glass may thin or relax under tension to remediate the streak 102.

Referring again to FIG. 9, when the system 200 includes the fiber optic cable 260 and the fiber optic connector 262, the heating laser 210 may generate the laser beam 202 and introduce the laser beam 202 to the end of the fiber optic cable 260. The laser beam 202 may propagate through the fiber optic cable 260 from the heating laser 210 to the fiber optic connector 262. The fiber optic connector 262 may transition the laser beam 202 from the fiber optic cable 260 to the atmosphere. The fiber optic connector 262 may further direct the laser beam 202 towards the glass ribbon 12, first half ribbon 62, or second half ribbon 82 or to the optical components 220 and beam splitter 230. The laser beam 202 may pass through the optical components 220 operable to change one or more properties of the laser beam 202 or beam path of the laser beam. At least a portion of the laser beam 202 may then be directed at the glass ribbon 12, first half ribbon 62, or second half ribbon 82 so that the laser beam 202 is incident on the glass at the location of the streak 102. As previously discussed, the laser beam 202 may heat the glass at the location of the streak 102, which may cause the streak 102 to be reduced.

Figure 10:
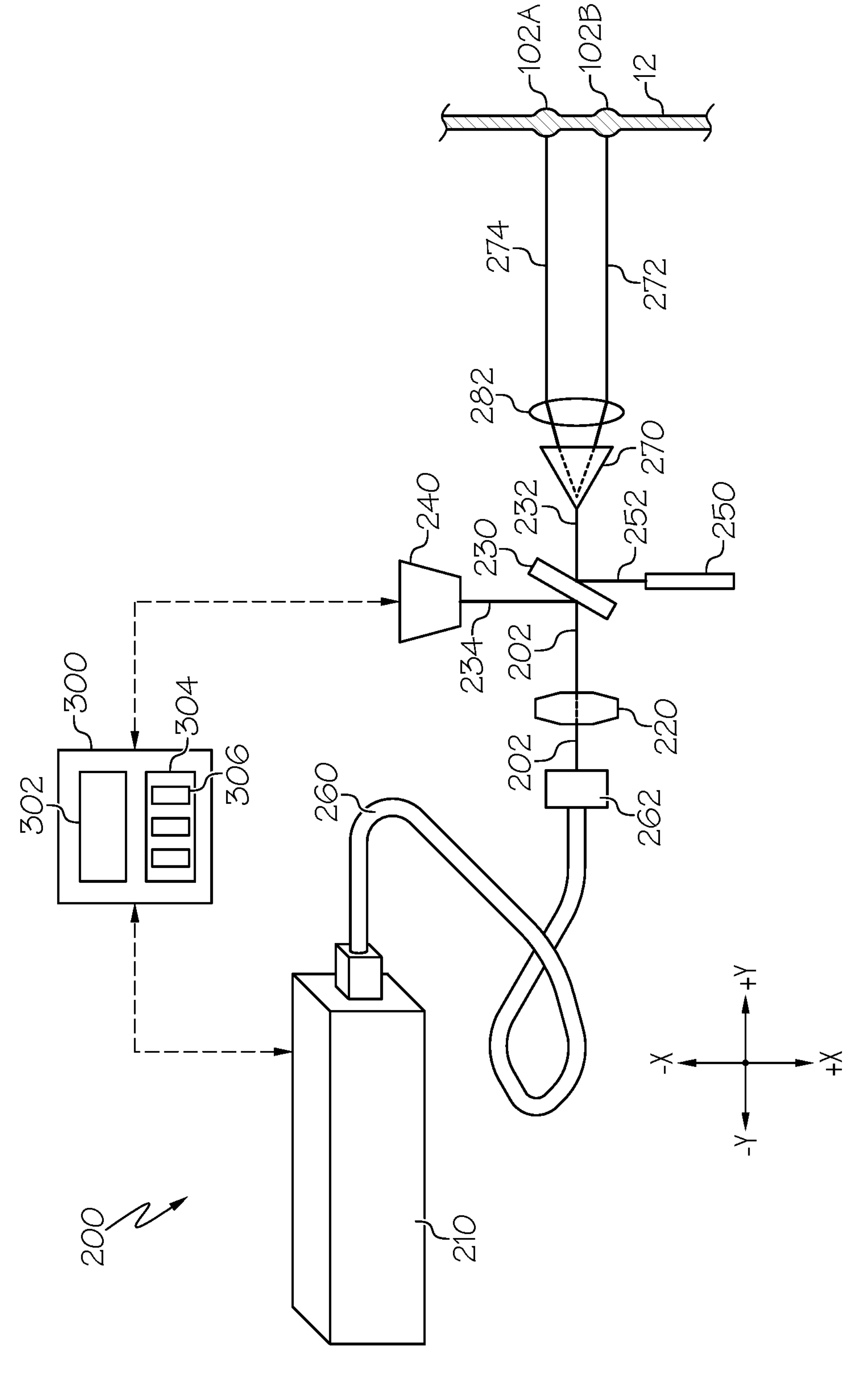
FIG. 10 schematically depicts still another system for remediating streak comprising optical components for dividing the laser beam into two beams for remediating two streaks or for remediating a recessed streak, according to one or more embodiments shown and described herein.

Referring now to FIG. 10, in some situations, the glass ribbon 12 may develop a plurality of streaks 102 in multiple locations along the width of the glass ribbon 12. FIG. 10 shows a first streak 102A and a second streak 102B, which may be spaced apart from each other along the width of the glass ribbon 12. Although two streaks are shown in FIG. 10, it is understood that the glass ribbon 12 could develop more than two streaks 102. The glass ribbon 12 may develop 1, 2, 3, 4, 5, 6, or more than six streaks. In situations where the glass ribbon 12 has two or more streaks 102, the system 200 may be configured to divide the laser beam 202 into two or more stationary laser beams and direct each of the two or more stationary laser beams to one of the streaks 102, such as first streak 102A, second streak 102B, or other streak. Each of the laser beams may heat the glass at the streak to which it is directed, which may cause the streak to be reduced. Thus, the system 200 may be configured to remediate a plurality of streaks 102 in the glass ribbon 102 simultaneously.

Referring again to FIG. 10, the system 200 may include at least one second beam splitter 270. The second beam splitter 270 may be disposed down beam relative to the beam splitter 230. The second beam splitter 270 may be operable to divide the laser beam 202, or the passthrough portion 232 of the laser beam 202 from the beam splitter 230, into a plurality of laser beams, such as 2, 3, 4, 5, 6, or more than 6 stationary laser beams. The second beam splitter 270) may include one or a plurality of beam splitters. In embodiments, the second beam splitter 270) may be operable to split the laser beam 202, or the passthrough portion 232, into at least a first beam 272 and a second beam 274. The second beam splitter 270 may include one or more of a prism, diffractive optical element, an axicon, or combinations of these.

The system 200 may further include one or a plurality of optical components configured to direct the first beam 272 and second beam 274 at the first streak 102A and the second streak 102B, respectively. In embodiments, the optical components of the system 200 may include at least one second focusing lens 280, which may be operable to focus the first beam 272, the second beam 274, or both at the locations of the plurality of streaks 102A, 102B.

Figure 11:
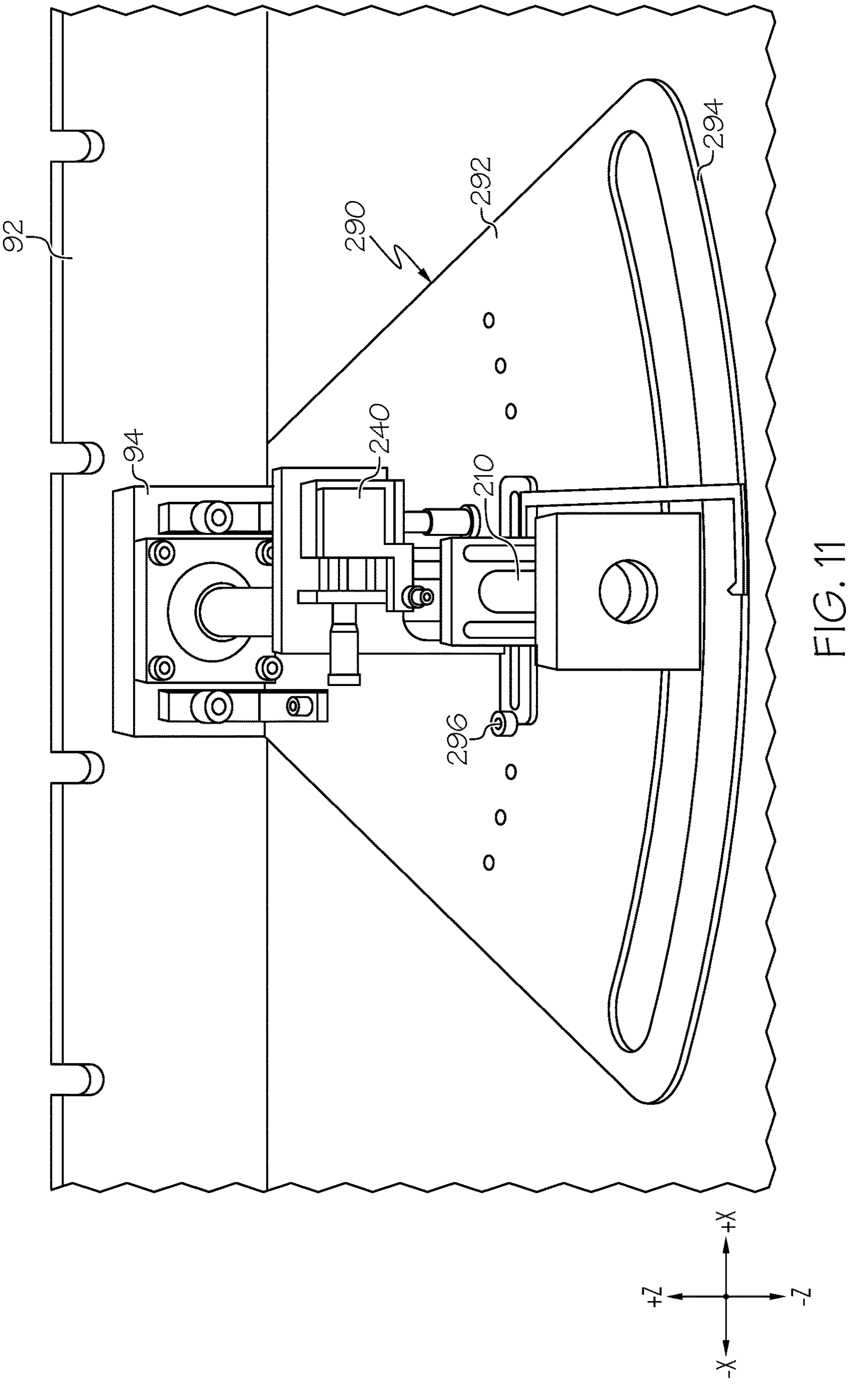
FIG. 11 is a perspective view of a positioning stage for positioning the laser beam relative to the glass ribbon, according to one or more embodiments shown and described herein.

Referring to FIG. 11, as previously discussed, the system 200 may include a fixture 290, to which the heating laser 210 or the fiber optic connector 262 and one or more of the optical components may be coupled. The fixture 290 may be a positioning stage 292 configured to change at least the horizontal position (e.g., in the +/−X and/or +/−Y direction of the coordinate axis in FIG. 11) of the laser beam 102 relative to the glass ribbon 12, first half ribbon 62, or second half ribbon 82. The fixture 290 may be coupled to a muffle 92, which may surround at least a portion of the glass forming apparatus 10. The muffle 92 may comprise one or a plurality of ports 94 that may allow for access to the interior of the muffle 92 and the glass ribbon 12 contained therein. The fixture 290 may be mounted to the muffle 92 proximate one of the ports 94 so that the laser beam 202 can pass through the port 94 to the glass ribbon 12, first half ribbon 62, or second half ribbon 82.

Since the ports 94 in the muffle 92 are generally at fixed positions, the fixture 290 may be a positioning stage 292 that is capable of rotating to change the beam path of the laser beam 202, such as by changing the angle of the laser beam 202 or portion thereof relative to the port 94. The rotating capability of the positioning stage 292 may enable the laser beam 202 to cover a significantly wide portion of the glass ribbon 12, first half ribbon 62, or second half ribbon 82 in the width direction (i.e., the +/−X direction of the coordinate axis in FIG. 11) depending on where the streak 102 is located on the glass ribbon 12. The positioning stage 292 may include a base plate 294 coupled to the muffle 92 at a pivot point. The heating laser 210 or the fiber optic connector 262 may be coupled to the base plate 294 along with the optical components 220, beam splitter 230, power detector 240, and second beam splitter 270. The sight laser 250 (FIG. 6) may also be coupled to the base plate 294.

The base plate 294 may be rotatable about the pivot point to change the angle of the laser beam 202 relative to the glass ribbon 12, which may change the horizontal position (i.e., position in the +/−X position of the coordinate axis of FIG. 11) relative to the glass ribbon 12. Rotation of the base plate 294 about the pivot point may be operable to position the laser beam 202 horizontally along the width of the glass ribbon 12, first half ribbon 62, or second half ribbon 82 in order to direct the laser beam 202 at the streak 102.

Figure 12:
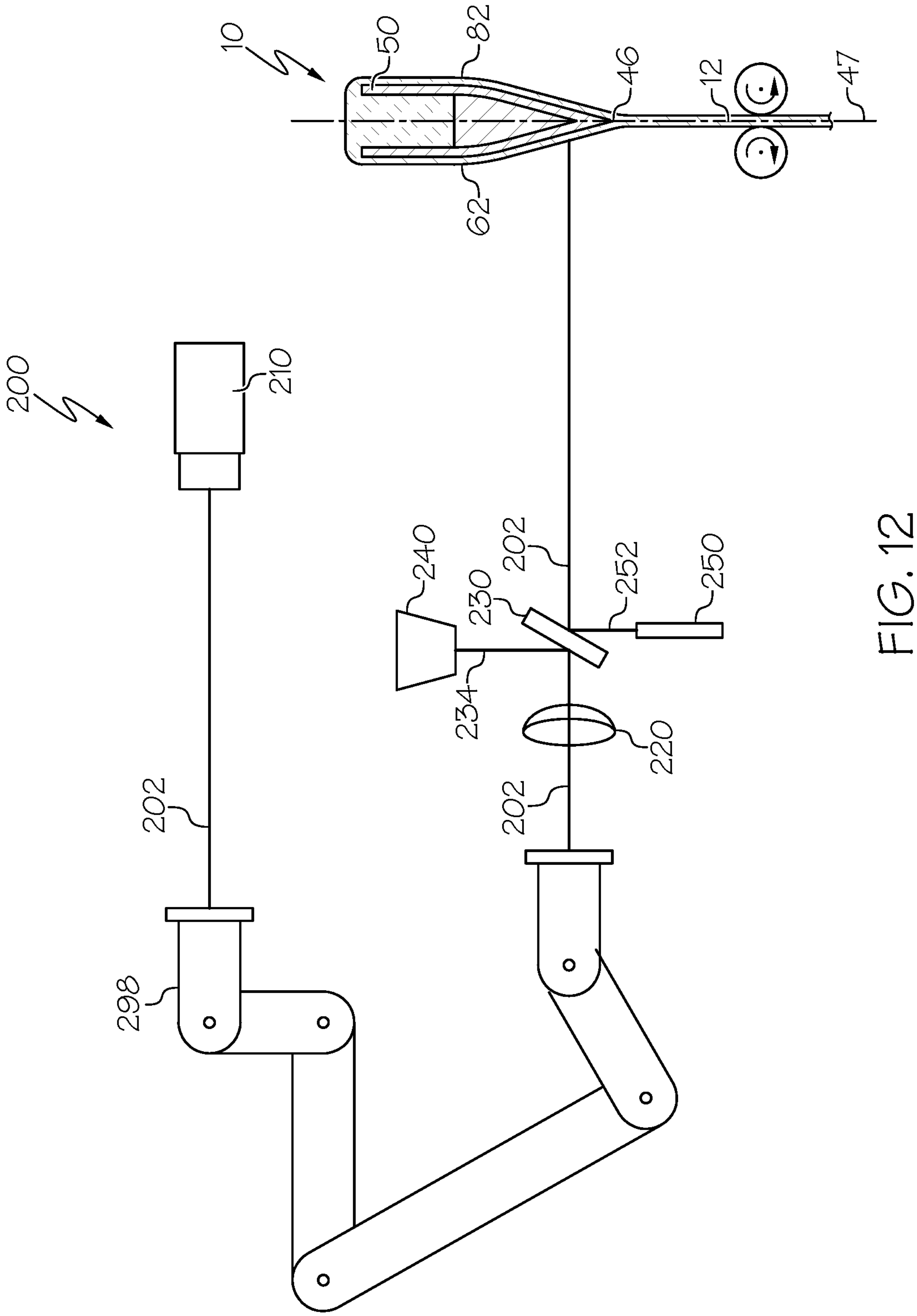
FIG. 12 is a perspective view of an articulated arm laser beam delivery system, according to one or more embodiments shown and described herein.

Referring now to FIG. 12, in embodiments, an articulated arm laser beam delivery system 298 may be used to deliver the laser beam 202 from the heating laser 210 to the glass ribbon 12, first half ribbon 62, or second half ribbon 82. The articulated arm laser beam delivery system 298 may comprise a plurality of movable joints and a plurality of mirrors operable to direct the laser beam 202 from the heating laser 210 to the glass ribbon 12, first half ribbon 62, or second half ribbon 82. The articulated arm laser beam delivery system 298 may provide an enclosed beam pathway with a controllable atmosphere. The articulated arm laser beam delivery system 198 may be used in place of a fiber optic cable to deliver the laser beam 202 from the heating laser 210 positioned at a location removed from the glass ribbon 12 to a position proximate the glass ribbon 12, first half ribbon 62, or second half ribbon 82. In embodiments, the articulated arm laser beam delivery system 298 may be operable to deliver a laser beam 202 having greater power output compared to a laser beam 202 suitable for delivery through a fiber optic cable.

Referring again to FIGS. 2, 3, and 6, in embodiments, the system may further include a control system 300. The control system 300 may include a processor 302, a memory module 304 communicatively coupled to the processor 302, and machine readable and executable instructions 306 stored on the memory module 304. Referring to FIGS. 2 and 3, the control system 300 may be communicatively coupled to the system 200 for remediating streak 102. Referring now to FIG. 6, when the control system 300 is communicatively coupled to the system 200 for remediating streak 102, the control system 300 may be communicatively coupled to the heating laser 210, the power detector 240, or both.

Referring again to FIG. 6, the control system 300 may be operable to maintain the stability of the laser beam 202 over an extended period of time to maintain consistent operation of the system 200. As previously discussed, the system 200 may include the beam splitter 230 operable to split the heating beam 202 into a passthrough portion 232 and a measurement portion 234. The measurement portion 234 of the laser beam 202 can be directed to the power detector 240. The control system 300 may receive an output from the power detector 240 and use the output from the power detector 240 to control the heating laser 210. In particular, the machine readable and executable instructions 306, when executed by the processor 302, may cause the system to automatically receive a signal from the power detector 240 indicative of a power of the laser beam 202, determine a measured power of the laser beam 202 from the signal received from the power detector 240, and adjust a power output of the heating laser 210 based on the measured power of the laser beam 202. The computer readable and executable instructions 306 may include instructions for conducting any of the other method steps discussed in the present application.

Referring again to FIGS. 3 and 6, methods of the present disclosure for remediating streak will be further discussed. Any of the following method steps may be accomplished using the control system 300 through execution of the computer readable and executable instructions 306 by the control processor 302. The methods for remediating streak 102 during a glass ribbon forming process may include forming the glass ribbon 12 with the glass forming process, which may be any of the glass ribbon forming process previously discussed herein. The methods may include maintaining the glass ribbon 12 under tension during the glass ribbon forming process. The methods may further include identifying the streak 102 of the glass ribbon 12 at a location along the width W of the glass ribbon 12 at which a rate of change in a thickness of the glass ribbon 12 per unit width of the glass ribbon 12 is greater than or equal to about 1 $nm_t/mm_W$, such as greater than or equal to about 3 $nm_t/mm_W$, greater than or equal to about 4 $nm_t/mm_W$, greater than or equal to about 5 $nm_t/mm_W$, greater than or equal to about 10 $nm_t/mm_W$, greater than or equal to about 20 $nm_t/mm_W$, or even greater than or equal to about 30 $nm_t/mm_W$. The streak 102 may have a streak width Ws (FIG. 4) of less than or equal to about 50 mm. Identifying the streak 102 may be accomplished by any of the techniques previously described herein. The streak 102 may have any of the other features or characteristics previously described herein for the streak 102. The methods further include directing the laser beam 202 at the streak location. The laser beam 202 may have a wavelength of from about 1 μm to about 12 μm. The laser beam 202 may have any of the other features or characteristics previously discussed herein. The laser beam 202 heats the glass ribbon 12, first half ribbon 62, or second half ribbon 82 at or proximate to the streak location. The heating of the glass ribbon 12, first half ribbon 62, or second half ribbon 82 at or proximate the location of the streak reduces the viscosity of the glass to reduce the thickness of the glass ribbon 12 at the streak location, reduce the rate of change in the thickness of the glass ribbon 12 at the location of the streak, or both.

The laser beam 202 may have a linear average power density of from about 10 mW/mm to 10 W/mm. The laser beam 202 may have a power of from about 0.1 watts (W) to about 50 W, depending on the width and thickness of the streak, the wavelength of the laser beam, and the vertical position of the laser beam 202. The laser beam 202 may have a beam width less than a full width half maximum of the change in the thickness of the glass ribbon 12 over the streak width, where the beam width is defined as the $1/e^2$ width of the laser beam 202 at the point where the laser beam 202 is incident on the glass ribbon 12. In embodiments, the laser beam 202 may have a beam width that is less than or equal to about 50 mm, less than or equal to about 40 mm, less than or equal to about 30 mm, less than or equal to about 20 mm, or less than or equal to about 10 mm. The laser beam 202 may have any of the other features or characteristics previously described herein for the laser beam 202, such as power, wavelength, width, position, shape, intensity distribution, etc.

Any of the methods disclosed herein may further include determining a width, a thickness profile, or both of the streak 102 and adjusting one or more of a power, position, shape, intensity distribution, or combinations of these of the laser beam 202 based on the width, the thickness profile, or both of the streak 102. In embodiments, the methods may include determining a thickness profile of the glass ribbon 12 at the streak location, such as over the streak width of the streak 102, and modifying at least one of a shape or an intensity distribution of the laser beam 202 based on the thickness profile of the glass ribbon 12 over the width of the streak. In embodiments, the laser beam 202 may have a top-hat intensity distribution or a Gaussian intensity distribution.

In embodiments, the streak 102 may be a protruding streak that protrudes outward from the glass ribbon 12, and the method may comprise directing the laser beam 202 at the center of the streak 102. Referring to FIG. 8A, in embodiments, the streak 102 may be a recessed streak, and the method may include splitting the laser beam 202 into a first beam 272 and a second beam 274, which is spaced apart from the first beam 272, and directing the first beam 272 and the second beam 274 to locations proximate the outer edges of the streak 102. Referring now to FIG. 10, in embodiments, any of the methods disclosed herein may further include identifying a first streak 102A and a second streak 102B, splitting the laser beam 202 into a first beam 272 and a second beam 274, directing the first beam 272 at the first streak 102A, and directing the second beam 274 at the second streak 102B. The first streak 102A and the second streak 102B may be identified using any of the methods previously described herein. For the case of a recessed streak or multiple streaks, splitting the laser beam 202 may include passing the laser beam 202 through a beam splitter, such as the second beam splitter 270 in FIGS. 8A and 10. Directing the first beam 272 and the second beam 274 to the first streak 102A and second streak 102B, or to the outer edges of the streak 102 in the case of a recessed streak, may including passing the first beam 272, second beam 274, or both through one or more optical components operable to redirect and/or focus the beams to the target locations.

In embodiments, any of the methods disclosed herein may include locating the laser beam 202 with a sight laser beam 252 reflected along the beam path of the laser beam 202. The sight laser beam 252 may have a wavelength in a range of from about 400 nm to about 700 nm. The sight laser beam 252 may have any of the features or characteristics previously described herein for the sight laser beam. In embodiments, directing the laser beam 202 at the streak 102 may include locating the laser beam 202 at a position along the streak 102 where the glass of the glass ribbon 12, first half ribbon 62, or second half ribbon 82 has a viscosity in a range of about $1\times10^4$ poise to about $7.6\times10^{7.6}$ poise. In embodiments, the position may be a vertical position along the streak 102, such as in the case of a fusion down draw process or a slot draw process.

Referring to FIGS. 3 and 5, in embodiments, identifying the streak 102 may include irradiating the glass ribbon 12 with light 114 from the inspection light source 110 and identifying light bands 116, dark bands 118, or both caused by refraction of the light 114 by the changing thickness of the glass ribbon 12 at the location of the streak 102. The light bands 116 and dark bands 118 may identify the location of the streak 102. In embodiments, directing the laser beam 202 at the streak location may include directing the laser beam 202 at the glass ribbon 12, wherein the laser beam 202 initially has a first power level sufficient to produce a change in the thickness of the glass ribbon 12. The method may further include measuring changes in the thickness of the glass ribbon 12 in response to the laser beam 202. The change in the thickness of the glass ribbon 12 in response to the laser beam 202 can identify the location of the laser beam 202 on the glass ribbon 12. The method may further include adjusting the position of the laser beam 202 to the streak location and reducing a power of the laser beam 202 to a second power level that is sufficient to remediate the streak.

A method of making a glass sheet may include forming the glass ribbon 12 with the glass forming process, which may be any of the glass ribbon forming processes previously discussed herein. The methods may include maintaining the glass ribbon 12 under tension during the glass ribbon forming process. The methods may further include identifying the streak 102 of the glass ribbon 12 at a location along the width W of the glass ribbon 12 at which a rate of change in a thickness of the glass ribbon 12 per unit width of the glass ribbon 12 is greater than or equal to about 1 $nm_t/mm_W$, such as greater than or equal to about 3 $nm_t/mm_W$, greater than or equal to about 4 $nm_t/mm_W$, greater than or equal to about 5 $nm_t/mm_W$, greater than or equal to about 10 $nm_t/mm_W$, greater than or equal to about 20 $nm_t/mm_W$, or even greater than or equal to about 30 $nm_t/mm_W$. The streak 102 may have a streak width Ws (FIG. 4) of less than or equal to 50 mm. Identifying the streak 102 may be accomplished by any of the techniques previously described herein. The streak 102 may have any of the other features or characteristics previously described herein for the streak 102. The methods further include directing the laser beam 202 at the streak location. The laser beam 202 may have a wavelength of from about 1 μm to about 12 μm. The laser beam 202 may have any of the other features or characteristics previously discussed herein. The laser beam 202 heats the glass ribbon 12, first half ribbon 62, or second half ribbon 82 at or proximate to the streak location. The heating of the glass ribbon 12, first half ribbon 62, or second half ribbon 82 at or proximate the location of the streak reduces the viscosity of the glass to reduce the thickness of the glass ribbon 12 at the streak location, reduce the rate of change in the thickness of the glass ribbon 12 at the location of the streak, or both.

Embodiments of the disclosure may be embodied in hardware and/or in software (including firmware, resident software, micro-code, etc.). The control system 300 of the system 200 and/or other controllers for the glass forming apparatus 10 may include at least one control processor 302 and the computer-readable storage medium (i.e., memory module 304) as previously described in this specification. The control system 300 may be communicatively coupled to one or more system components (e.g., heating laser 210, power detector 240, sight laser 250, streak inspection system 108, etc.) via any wired or wireless communication pathway. A computer-usable or the computer-readable storage medium or memory module 304 may be any medium that can contain, store, communicate, propagate, or transport the program for use by or in connection with the instruction execution system, apparatus, or device.

The computer-usable or computer-readable storage medium or memory module 304 may be, for example but not limited to, an electronic, magnetic, optical, electromagnetic, infrared, or semiconductor system, apparatus, device, or propagation medium. More specific examples (a non-exhaustive list) of the computer-readable storage medium or memory module 304 may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable storage medium or memory module 304 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer-readable storage medium or memory module 304 may include the machine readable and executable instructions 306 for carrying out operations of the system 200 present disclosure or methods for remediating streak using the system 200. The machine readable and executable instructions 306 may include computer program code that may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

EXAMPLES

The embodiments described herein will be further clarified by the following non-limiting examples.

Example 1: Remediate of Streak Using a Laser Beam

Figure 13:
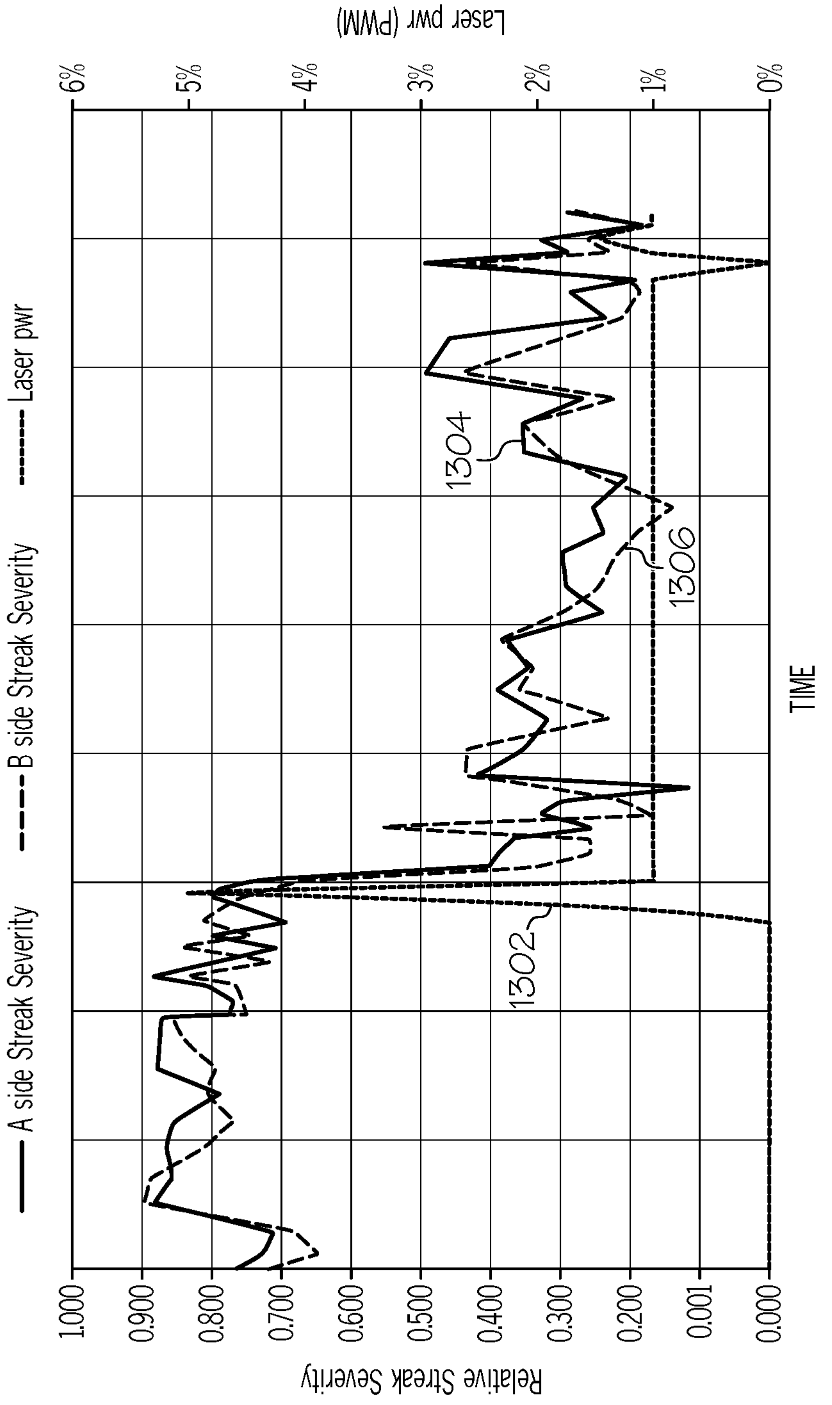
FIG. 13 graphically depicts streak severity (left y-axis) and laser beam power (right y-axis) as a function of time (x-axis) for a system for remediating streak, according to one or more embodiments shown and described herein.

In Example 1, a low power CO2 laser beam was used to remediate streak in glass ribbon produced by a fusion downdraw process, such as that shown in FIG. 1. The CO2 laser beam had a wavelength of 10.6 μm. The laser beam was passed through a polycrystalline fiber optic cable and was collimated using a collimating lens comprising a ZnSe lens. The laser beam was then directed onto a streak identified on the glass ribbon. A portion of the laser beam was reflected to a power detector and the power of the laser was monitored. The power output of the laser beam for Example 1 as a function of time is shown in FIG. 13 and is identified therein by reference number 1302.

The relative severity of the streak was evaluated at regular time intervals before and after directing the laser beam at the streak. The relative severity of the streak is based on the thickness profile of the glass ribbon in the region of the streak and provides an indication of the degree to which the thickness changes at the streak. Referring now to FIG. 13, the relative severity of the steak (y-axis) as a function of time (x-axis) is graphically depicted along with the power output of the laser beam. In FIG. 13, reference number 1304 refers to the relative severity of the streak on the A side of the glass ribbon, which is the side on which the laser beam is incident, and reference number 1306 refers to the relative severity of the streak on the B side of the glass ribbon. As shown in FIG. 13, directing the laser beam having a power of 1% at the streak on the glass ribbon 12 reduced the severity of the streak by greater than 50% compared to the severity of the streak before application of the laser beam (reduced severity from an average of 0.8 to less than 0.4). This shows that directing the laser beam at the streak can substantially reduce the severity of the streak.

Example 2: Operation of a Positioning Stage for Positioning the Laser Beam

Figure 14:
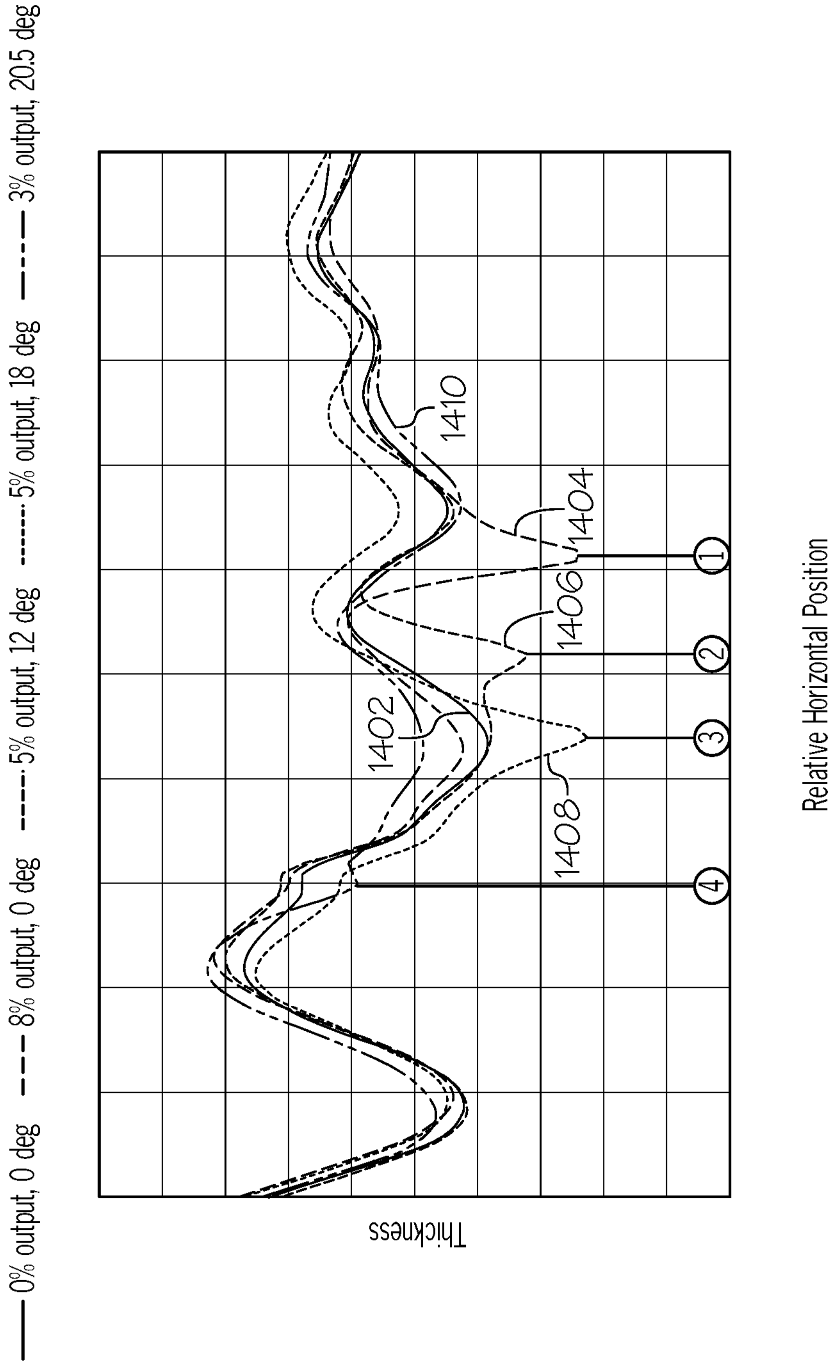
FIG. 14 graphically depicts thickness (y-axis) as a function of width position on the glass sheet (x-axis) for various combinations of heating laser beam power and position, according to one or more embodiments shown and described herein.

In Example 2, a positioning stage was used to change the horizontal position of the laser beam on the glass ribbon and the changes in glass thickness in response to changes in the positioning and power of the laser beam were evaluated. For Example 2, a glass ribbon was produced by a fusion downdraw process. The positioning stage comprising a base plate pivotable about a pivot point, as schematically depicted in FIG. 11, was coupled to the muffle of the fusion downdraw process at a window of the muffle. The heating laser and optical components were coupled to the base plate of the positioning stage. The horizontal position of the positioning stage was such that at a pivot angle of the positioning stage equal to zero, the laser beam produced by the system was incident on the glass ribbon at a position of about 1310 mm from the inlet end of the forming body of the fusion downdraw process. The same CO2 laser and optical components from Example 1 were used to generate the laser beam for Example 2. The pivot angle and the power output of the laser beam were changed and the thickness of the glass ribbon in response to the laser beam was monitored. Referring to FIG. 14, the changes in the thickness of the glass ribbon 12 as a function of horizontal position is graphically depicted for each of the changes to the operating parameters of the laser and positioning stage. The pivot angle, laser power, and reference number for FIG. 14 for each setting of the system of Example 2 are provided in the table below.

| Reference Number in FIG. 14 | Pivot Angle | Laser Power |
|---|---|---|
| 1402 | 0 | 0 |
| 1404 | 0 | 8% |
| 1406 | 12 | 5% |
| 1408 | 18 | 5% |
| 1410 | 20.5 | 3% |

Referring again to FIG. 14, reference number 1402 provides the baseline thickness profile of the glass ribbon with no laser beam incident on the ribbon. The thickness data for ref. no. 1404 shows a valley at about 1310 mm indicated by point number 1 in FIG. 14, which indicates the location where the laser beam falls incident on the glass ribbon. The valley at point number 1 on FIG. 14 shows that the laser beam having a power output of 8% of maximum produces a reduction of about 2.5 thickness units compared to the thickness of the glass ribbon without the laser beam (ref. no. 1402), where each thickness unit in FIG. 14 is equal to 0.001 mm (e.g., 2.5 thickness units equals a change in thickness of 0.0025 mm). As the pivot angle is increased from 0 degrees to 20.5 degrees, the location of the valley corresponding to the position of the laser beam shifts to the right in the direction of decreasing distance from the inlet end. Point 2 corresponds to the laser beam position for reference no. 1406 (angle of 12 degrees), Point 3 indicates the laser beam location for reference no. 1408 (18 degrees), and Point 4 indicate the laser beam location for reference no. 1410 (20.5 degrees). Thus, as the pivot angle of the positioning stage changes, the location of the laser beam changes. A 20 degree pivot of the positioning stage enabled the position of the laser beam to be adjusted over a width range of about 160 mm.

Additionally, as the power is decreased, the magnitude in the change in the thickness compared to no laser beam (1402) decreases. At 5% laser power (ref. nos. 1406 and 1408), the difference in thickness is reduced by about 20% compared to the laser power at 8% (e.g., from about 2.5 thickness units (i.e., 0.0025 mm) to about 2.0 thickness units (i.e., 0.0020 mm) in FIG. 14). When the power is reduced even further to 3% (ref. no. 1410), the difference in thickness is reduced by about 60% compared to the laser power at 8% (e.g. from about 2.5 thickness units (i.e., 0.0025 mm) to about 1.0 thickness units (e.i., 0.0020 mm)). Example 2 shows that the heating effect of the laser beam can be adjusted by changing the power output of the laser. Thus, the degree to which the laser beam reduces the severity of the streak can be modified by changing the power output of the laser.

Based on the foregoing, it should now be understood that the embodiments described herein relate to glass forming processes for producing glass ribbons and methods of reducing the severity of steak in the glass ribbons. While various embodiments and techniques for producing glass ribbons and remediating streak in the glass ribbons and shown and described in the present application, it should be understood it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus, it is intended that the specification cover such modifications and variations of the various embodiments described herein provided such modification and variations come within the scope of the appended claims and their equivalents.

The invention claimed is:

1. A method for remediating streak during a glass ribbon forming process, the method comprising:

forming the glass ribbon;

maintaining the glass ribbon under tension;

identifying a first streak of the glass ribbon at a location along a width of the glass ribbon at which a rate of change in a thickness of the glass ribbon per unit width of the glass ribbon is greater than or equal to about 1 $nm_t/mm_W$, wherein a width of the first streak is less than or equal to about 50 mm;

directing a laser beam at the location of the first streak, wherein:

the laser beam has a wavelength of from about 1 μm to about 12 μm;

the laser beam heats a glass of the glass ribbon at the location of the first streak; and heating the glass at the location of the first streak reduces a viscosity of the glass to reduce the thickness of the glass ribbon at the location of the first streak, the rate of change in the thickness of the glass ribbon at the location of the first streak, or both, wherein a beam width of the laser beam at the point where the laser beam is incident on the glass is less than or equal to a full width half maximum of the change in the thickness of the glass ribbon over the width of the first streak, where the beam width is defined as the $1/e^2$ width of the laser beam.

2. The method of claim 1, wherein the laser beam comprises a linear average power density of from about 10 milliwatts per millimeter (mW/mm) to about 10 watts per millimeter (W/mm).

3. The method of claim 1, wherein the beam width less than or equal to about 50 mm.

4. The method of claim 1, further comprising determining a width, a thickness profile, or both of the first streak and adjusting one or more of a power, position, shape, intensity distribution, or combinations of these of the laser beam based on the width, the thickness profile, or both of the first streak.

5. The method of claim 1, wherein the laser beam comprises a top-hat intensity distribution or a Gaussian intensity distribution.

6. The method of claim 1, further comprising:

identifying a second streak;

splitting the laser beam into a first beam and a second beam; and directing the first beam at the first streak and directing the second beam at the second streak.

7. The method of claim 1, further comprising locating the laser beam with a sight laser beam reflected along a beam path of the laser beam, wherein the sight laser beam has a wavelength in a range of from about 400 nm to about 700 nm.

8. The method of claim 1, wherein the first streak is a protruding streak and the method comprises directing the laser beam at a center of the first streak.

9. The method of claim 1, wherein the first streak is a recessed streak and the method comprises splitting the laser beam into a first beam and a second beam spaced apart from the first beam and directing the first beam and the second beam to locations at outer edges of the first streak.

10. The method of claim 1, wherein identifying the first streak comprises:

irradiating the glass ribbon with a light source; and identifying light bands, dark bands, or both caused by refraction of the light by the changing of the thickness of the glass ribbon at the location of the first streak, wherein the light bands, dark bands, or both identify the location of the first streak.

* * * * *